US011347191B2

(12) United States Patent
Hsu

(10) Patent No.: US 11,347,191 B2
(45) Date of Patent: May 31, 2022

(54) SYSTEM AND METHOD TO FACILITATE WELDING SOFTWARE AS A SERVICE

(71) Applicant: Illinois Tool Works Inc., Glenview, IL (US)

(72) Inventor: Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 665 days.

(21) Appl. No.: 15/222,325

(22) Filed: Jul. 28, 2016

(65) Prior Publication Data

US 2017/0032281 A1 Feb. 2, 2017

Related U.S. Application Data

(60) Provisional application No. 62/198,450, filed on Jul. 29, 2015.

(51) Int. Cl.
*G06N 5/04* (2006.01)
*G06N 7/00* (2006.01)
(Continued)

(52) U.S. Cl.
CPC ........ *G05B 13/0265* (2013.01); *B23K 9/0953* (2013.01); *B23K 31/125* (2013.01);
(Continued)

(58) Field of Classification Search
CPC .............. B23K 31/125; B23K 9/0953; G05B 23/0283; G06N 5/04; G06N 7/005;
(Continued)

(56) References Cited

U.S. PATENT DOCUMENTS 5,221,825 A 6/1993 Siewert et al.
6,362,456 B1 3/2002 Ludewig et al.
(Continued)

FOREIGN PATENT DOCUMENTS

CN 101329169 A 12/2008
WO WO2012000650 1/2012

OTHER PUBLICATIONS

S.B. Kotsiantis, Supervised Machine Learning: A Review of Classification Techniques, 2007, Informatica 31 (2007), pp. 249-268 (Year: 2007).*

(Continued)

*Primary Examiner* — Omar F Fernandez Rivas
*Assistant Examiner* — Selene A. Haedi
(74) *Attorney, Agent, or Firm* — McAndrews, Held & Malloy, Ltd.

(57) ABSTRACT

A weld production knowledge system for processing welding data collected from one of a plurality of welding systems, the weld production knowledge system comprising a communication interface communicatively coupled with a plurality of welding systems situated at one or more physical locations. The communication interface may be configured to receive, from one of said plurality of welding systems, welding data associated with a weld. The weld production knowledge system may comprise an analytics computing platform operatively coupled with the communication interface and a weld data store. The weld data store employs a dataset comprising (1) welding process data associated with said one or more physical locations, and/or (2) weld quality data associated with said one or more physical locations. The analytics computing platform may employ a weld production knowledge machine learning algorithm to analyze the welding data vis-à-vis the weld data store to identify a defect in said weld.

30 Claims, 13 Drawing Sheets

(51) Int. Cl.

| | |
|---|---|
| *G05B 13/02* | (2006.01) |
| *G06N 20/00* | (2019.01) |
| *G06Q 10/06* | (2012.01) |
| *G05B 23/02* | (2006.01) |
| *B23K 9/095* | (2006.01) |
| *B23K 31/12* | (2006.01) |
| *H04L 67/10* | (2022.01) |

(52) U.S. Cl.
CPC .......... *G05B 23/0229* (2013.01); *G06N 5/04* (2013.01); *G06N 7/005* (2013.01); *G06N 20/00* (2019.01); *G06Q 10/06* (2013.01); *H04L 67/10* (2013.01); *Y02P 90/80* (2015.11)

(58) Field of Classification Search
CPC ...... G06N 20/00; G06N 99/005; G06Q 10/06; H04L 67/10; H04L 12/1881; H04L 67/16; Y02P 90/86; H04W 28/065; H04W 48/10; H04W 4/06; H04W 52/0216; H04W 68/02; H04W 72/005; H04W 72/0446; H04W 72/1278; H04W 8/005; Y02D 70/00; Y02D 70/142; Y02D 70/166; Y02D 70/144; Y02D 70/22; Y02D 70/23
See application file for complete search history.

(56) References Cited

U.S. PATENT DOCUMENTS

| | | | |
|---|---|---|---|
| 6,636,776 B1 | 10/2003 | Barton et al. | |
| 8,354,614 B2 | 1/2013 | Ma et al. | |
| 8,657,605 B2 | 2/2014 | Wallace et al. | |
| 9,253,054 B2* | 2/2016 | Maturana | H04L 43/04 |
| 2008/0124968 A1 | 6/2008 | Daniel et al. | |
| 2009/0200281 A1* | 8/2009 | Hampton | B23K 9/10 |
| | | | 219/130.33 |
| 2011/0108181 A1* | 5/2011 | Cai | B29C 65/08 |
| | | | 156/64 |
| 2011/0114615 A1* | 5/2011 | Daniel | B23K 9/095 |
| | | | 219/137 R |
| 2011/0172796 A1* | 7/2011 | Sohmshetty | G05B 19/41865 |
| | | | 700/98 |
| 2013/0075380 A1 | 3/2013 | Albrech et al. | |
| 2013/0178953 A1* | 7/2013 | Wersborg | B23K 1/0056 |
| | | | 700/48 |
| 2013/0189658 A1 | 7/2013 | Peters et al. | |
| 2013/0211559 A1* | 8/2013 | Lawson | G06Q 10/06315 |
| | | | 700/83 |
| 2013/0212512 A1 | 8/2013 | Frenz | |
| 2013/0291271 A1* | 11/2013 | Becker | G06F 3/005 |
| | | | 2/8.2 |
| 2014/0042135 A1* | 2/2014 | Daniel | B23K 9/10 |
| | | | 219/130.5 |
| 2014/0047107 A1 | 2/2014 | Maturana et al. | |
| 2014/0337429 A1* | 11/2014 | Asenjo | H04L 65/403 |
| | | | 709/204 |

OTHER PUBLICATIONS

Matteo Matteucci, A Tutorial on Clustering Algorithms: K-Means Clustering, Mar. 30, 2013, https://home.deib.polimi.it/matteucc/Clustering/tutorial_html/kmeans.html (Year: 2013).*

Rabi Padhy, Big Data Processing with Hadoop-MapReduce in Cloud Systems, Feb. 2013, IJ-CLOSER, vol. 2, No. 1, pp. 16-27 (Year: 2013).*

Nagra, Technical Report 09-05: Critical Review of Welding Technology for Canisters for Disposal of Spent Fuel and High Level Waste, Mar. 2010, https://www.nagra.ch/data/documents/database/dokumente/$default/Default%20Folder/Publikationen/NTBs%202001-2010/e_ntb09-05.pdf (Year: 2010).*

"The welding system of the future is self-learning (2015, Mar. 20) retrieved Apr. 7, 2015 fromhttp://phys.org/news/2015-03-welding-future-self-learning.html".

Gundersen, O., et al., The Use of an Integrated Multiple Neural Network Structure for Simultaneous Prediction of Weld Shape, Mechanical Properties, and Distortion in 6063-T6 and 6082-T6 Aluminium Assemblies.

Huot, Pierre, The Basics of Weld and Process Monitoring, 20150409, Quality Magazine.

Porter, Nancy C., Session 5, Joining Technologies for Naval Applications, FABTECH International & AWS Welding Show, Nov. 13-16, 2015.

Zaharia, Matei, et al., Resilient Distributed Datasets: A Fault-Tolerant Abstraction for In-Memory Cluster Computing, Electrical Engineering and Computer Sciences, University of California at Berkeley, Technical Report No. UCB/EECS-2011-82, http://www.eecs.berkeley.edu/Pubs/TechRpts/2011/EECS-2011-82.html, Jul. 19, 2011.

Bao, Yuan et al: "Massive sensor data management framework in Cloud manufacturing based on Hadoop", Industrial Informatics (INDIN), 2012 10th IEEE International Conference on, IEEE, Jul. 25, 2012 (Jul. 25, 2012), pp. 397-401, XP032235317, DOI: 10.1109/1 NDI N.2012.6301192 ISBN: 978-1-4673-0312-5.

Lu, Huang et al: "Research on Hadoop Cloud Computing Model and its Applications", Networking and Distributed Computing (ICNDC), 2012 Third International Conference on, IEEE, Oct. 21, 2012 (Oct. 21, 2012), pp. 59-63, XP032293322, DOI: 10.1 109/1 CN DC.2012. 22 ISBN: 978-1-4673-2858-6.

International Search Report and Written Opinion, dated Oct. 14, 2016, in International application No. PCT/US2016/044463, filed Jul. 28, 2016.

Official Action dated Nov. 20, 2018, in Canadian Patent Application No. 2,993,824.

Official Action dated Nov. 21, 2019, in Canadian Patent Application No. 2,993,824.

Yuan Bao, et. al., "Massive Sensor Data Management Framework in Cloud Manufacturing Based on Hadoop", IEEE, Jul. 25, 2012, pp. 397-401 (Y type reference).

* cited by examiner

SYSTEM AND METHOD TO FACILITATE WELDING SOFTWARE AS A SERVICE

CROSS-REFERENCE TO RELATED APPLICATION

The present application claims the benefit under 35 U.S.C. § 119(e) of provisional patent application Ser. No. 62/198,450, filed Jul. 29, 2015, the contents of which are hereby incorporated by reference.

BACKGROUND OF THE INVENTION

Welding is a process that has increasingly become a key differentiator of metal fabricators in many industries. Due to the global competition, fabricators are relentlessly looking for new ways to improve weld quality, productivity, efficiency, flexibility, scalability, and labor predictability/dependency in lean manufacturing, meantime reduce capital investment, and total ownership costs. Therefore, there is a need to provide welding knowledge and insight for fabricators as services to achieve operational excellence in welding related operations, in addition to just providing welding equipment and consumables. There is, however, a lack of infrastructure and scale economics to connect the service providers to the fabricators. Thus, there is a need of "Welding as a Service" (WaaS) from fabricators.

Welding systems may be coupled to the power grid, or use a fuel-powered engine to drive an electric power generator, which in turn generates the required current for the specific welding operation. The size of the engine and electric generator is dictated by the maximum welding current output rating of the welder. For instance, a welder that is rated to generate a 300-amp, 33.3-volt arc can require at least 9.99 kilowatts of power to generate such an arc. Indeed, the power source is often configured to output a higher power (e.g., about 30% higher) than what is required by the arc to account for power conversion efficiency and power loss that may result from, for example, a weld cable voltage drop. Thus, the engine in such a welder must have sufficient horsepower to drive an electric generator to generate about 13 kilowatts of power to supply the maximum welding current output rating of the welder at any given time.

Welding quality control was historically performed manually. For example, the welder, a supervisor, and/or a certified weld inspector would visually inspect each completed weldment, or a sampling thereof (e.g., 1 out of ever "x" units), to identity unacceptable welds. In high volume production, however, automated weld quality assurance techniques have been employed. In a general sense, weld quality assurance may use technological and statistical methods and actions to test or assure the quality of welds, and to confirm the presence, size, length, location, and coverage of welds and the distortion of the weldment. Because the weld connections between two pieces of metal may encounter static and cyclical loads or may be exposed to thermally, chemically, or mechanically adverse operating environment during the product's lifetime, there is a chance that the weld connections may fail if not created to proper specification.

Additionally, welding equipment maintenance was performed manually either preventatively or on-demand. For example, if a service technician observes that a robot weld station has stopped and is holding up the entire production line, the technician may put the station into a service state, open up the fence, and enter the station area to troubleshoot and to ultimately discover, for example, that the contact tip of welding torch is damaged. The technician then replaces the contact tip with a hand tool, rethreads the welding wire, closes the fence, puts the station back to automatic state, and resumes the robot cycle. This type of unscheduled downtime, manual intervention, and non-value added activities are obstacles towards a lights-out factory (i.e., fully automated without requiring on-site human presence). In another example, a service technician replaces used contact tips for all weld cells in the facility at every shift change, although some contact tips are still halfway through useful life but other tips have failed prior to shift change causing unexpected downtime.

A number of developments have been made with regard to network computing, and more recently, "cloud computing," Industry 4.0, and industrial Internet of Things (IoT) that may be applied to increase welding and fabrication productivity. Cloud computing is, in essence, a large scale distributed computing paradigm for utility computing based on virtualized, dynamically scalable pool of resources and services that can be delivered on-demand over the Internet. For example, commonly owned U.S. Patent Publication No. 2013/0075380 to Bruce Patrick Albrecht et al. discloses a welding system that can communicate with network-based resources for the provision of services and products to facilitate the welding operations. Further, commonly owned U.S. Pat. No. 8,354,614 to Tiejun Ma et al. discloses a method of monitoring contact tip useful life in a welding torch based on, for example, arc signals, i.e. current level, current standard deviation, and voltage. Changing contact tip based on welding process signals is an example of condition-based maintenance (CBM). If the prediction of contact tip failure is accurate, the contact tip may be changed automatically by a tip change station, without human intervention, when the machine learning (ML) algorithm determines the likelihood of tip failure is imminent. CBM will improve robotic welding cell up-time, decrease maintenance cost (contact tip consumption), and decrease the number of tip change operations and the associated human error. Further, World Publication No. WO2012000650 to Stork Genannt Wersborg Ingo, which was filed Jun. 28, 2011, is directed to a method for classifying a multitude of images recorded by a camera observing a processing area and a laser material processing head using the same. The publication discusses adaptive control and monitor of laser material processing using artificial network (ANN), support vector machine (SVM), fuzzy k-nearest neighbor (KNN) classification. U.S. Patent Publication No. 2013/0189658 and U.S. Pat. No. 8,657,605 relate to arc welding simulations that provide simulation of virtual destructive and non-destructive testing and inspection of virtual weldments for training purposes. U.S. Patent Publication No. 2014/0337429 to Juan L. Asenjo et al., which was filed Nov. 22, 2013, describes an industrial automation, and, more particularly, techniques for providing industrial data to a network platform for analysis by network-based applications and services. Finally, U.S. Pat. No. 5,221,825 to T. A. Siewert describes a method of sensing and controlling a gas metal arc welding process employs high frequency sampling of electrical signals from the welding circuit.

The foregoing efforts are very application-specific, require high maintenance, are labor intensive not cost effective, and cannot be scaled or widely adopted in an actual production environment independently. Thus, a need exists for an improved weld production knowledge system and method that can automatically and adaptively learn the relationship between the welding process behavior, quality output, and equipment reliability of actual welding operations. Further, a need exists for a means of developing a large welding dataset feeding off many welding stations in production, which maybe be used in connection with improved quality and predictability of the weld production knowledge system. As set forth in the following disclosure, the present invention relates to the art of machine learning, data mining and artificial intelligence in welding fabrication production, in order to, inter alia, automate human decision-making process in welding equipment preventative/predictive maintenance (PPM) and condition-based maintenance (CBM), and weld quality control in mass production environment. More specifically, it provides ease of use, higher performance, and lower cost.

BRIEF SUMMARY

The invention relates to the art of machine learning, data mining, and artificial intelligence in welding fabrication production, in order to automate human decision-making process in welding equipment preventative/predictive maintenance (PPM) and condition-based maintenance (CBM), weld quality control and weld engineering. The invention further relates to a cloud based predictive analytics platform of welding knowledge service in mass production and manufacturing, for example, by supervised classification and unsupervised data mining and clustering, to minimize human interaction in welding production activities, such as welding operation, welding equipment maintenance, weld quality inspection and weld engineering. The invention is scalable and cost-effective mass customization approach to build individualized digital replica or digital twin or thread of the human decisions of pre-existing weld quality control and weld equipment maintenance functions in any factory.

According to a first aspect, a welding system comprises: a first processing circuitry to process a first welding input from a first data source to define first welding data, wherein the first data source is associated with a weld, weldment, or weld process; a second processing circuitry to process a second welding input from a second data source to define second welding data, wherein the second data source is associated with the weld, weldment, or weld process; and a communication network communicatively coupled with the first processing circuitry, the second first processing circuitry, and a remotely situated analytics computing platform, wherein the communication network communicates the first welding data and the second welding data to said remotely situated analytics computing platform via a communication network, wherein the remotely situated analytics computing platform is facilitated via a cloud computing framework that employs a distributed and scalable file system running on commodity cluster hardware, herein the remotely situated analytics computing platform associates the first welding data with the second welding data based at least in part on tag data to define a welding data set, wherein the remotely situated analytics computing platform generates or updates a large scale dataset based at least in part on said welding data set, the large scale dataset comprising weld operational, production and productivity data, weld quality data, weldment quality data, welding process data, and welding machine parameters data collected from a plurality of heterogeneous data sources, and wherein the remotely situated analytics computing platform employs a production knowledge machine learning algorithm to analyze the welding data set vis-à-vis the large scale dataset to predict a characteristic of the weld, weldment, or weld process.

According to a second aspect, a production knowledge system for processing information collected from welding equipment, the production knowledge system comprises: a communication network communicatively coupled with welding equipment situated at one or more physical locations, wherein the communication network is configured to receive, from said welding equipment, first welding data representing a first welding input from a first data source and second welding data representing a second welding input from a second data source; and an analytics computing platform remotely situated from the welding equipment and operatively coupled with the communication network, wherein the remotely situated analytics computing platform is facilitated via a cloud computing framework that employs a distributed and scalable file system running on commodity cluster hardware, wherein the remotely situated analytics computing platform associates the first welding data with the second welding data based at least in part on tag data to define a welding data set, wherein the analytics computing platform generates or updates a large scale dataset based at least in part on said welding data set, the large scale dataset comprising weld operational, production and productivity data, weld quality data, weldment quality data, welding process data, and welding machine parameters data collected from a plurality of heterogeneous data sources, and wherein the remotely situated analytics computing platform employs a production knowledge machine learning algorithm to analyze the welding data set vis-à-vis the large scale dataset to predict a characteristic of the welding equipment or the weld, weldment, or weld process.

According to a third aspect, a production knowledge system for processing welding data set, the production knowledge system comprises: a communication network communicatively coupled with welding equipment situated at two or more physical locations, wherein the communication network is configured to receive, from said welding equipment, welding data set associated with at least one weld, wherein the welding data set is generated based at least in part on an output signal from one or more sensors, or from one or more databases, and wherein said one or more sensors are situated to capture one or more attributes of a weld or welding process; and processing circuitry that is situated remotely from at least one of said two or more physical locations, wherein the processing circuitry is operatively coupled with the communication network and a weld data store, wherein the weld data store employs a dataset, said dataset comprising weld manufacturing data collected from a plurality of physical locations, and wherein the processing circuitry employs a scalable machine learning algorithm to analyze the welding data set vis-à-vis the weld manufacturing data to predict a characteristic of said at least one weld or weldment, or to predict a characteristic of said welding equipment.

In certain aspects, the first data source and the second data source each include: a sensor; a non-transitory data storage device; an operator interface; a database inside or outside welding equipment; or a combination thereof.

In certain aspects, the first data source and the second data source are associated with a weld, weldment, weld process, welding equipment, welding consumables, pre-welding manufacturing operations, post-welding manufacturing operations, manufacturing execution system, enterprise resource planning system, and/or supervisory control and data acquisition system.

In certain aspects, the first data source is associated with a first physical location and the second data source is associated with a second physical location that is different from said first physical location.

In certain aspects, the first data source and the second data source are associated with the same physical location.

In certain aspects, the first data source and the second data source are heterogeneous data sources.

In certain aspects, the remotely situated analytics computing platform cleans or formats the first welding data and the second welding data into a standardized or structured form.

In certain aspects, the production knowledge machine learning algorithm is agnostic to welding operation type, weldment type, or welding application type.

In certain aspects, the remotely situated analytics computing platform is further configured to generate a control signal based at least in part on the predicted characteristic that is transmitted back to a weld cell for weld process control.

In certain aspects, cloud computing framework is a Platform as a Service (PaaS) or an Infrastructure as a Service (IaaS).

In certain aspects, the cloud computing framework employs MapReduce parallel processing.

In certain aspects, the cloud computing framework is a platform for managing heterogeneous distributed data center infrastructures.

In certain aspects, the production knowledge machine learning algorithm is a scalable machine learning algorithm.

In certain aspects, production knowledge machine learning algorithm is an unsupervised learning algorithm that employs at least one technique selected from a group consisting of: (1) k-means; (2) principal component analysis; (3) hierarchical clustering; (4) self-organizing maps; (5) fuzzy k-means; (6) Dirichlet distribution; (7) independent component analysis; (8) expectation-maximization; (9) mean-shift; and (10) competitive layer neural network.

In certain aspects, the production knowledge machine learning algorithm is a supervised learning algorithm that employs at least one technique selected from a group consisting of: (1) linear regression; (2) logistic regression; (3) adaptive logistic regression; (4) artificial neural networks; (5) support vector machines; (6) Naïve Bayesian classifiers; (7) decision trees; (8) random forests; (9) recurrent neural network; (10) nonlinear autoregressive; (11) radial basis; and (12) learning vector quantization algorithms.

In certain aspects, the predicted characteristic is employed to facilitate a function selected from a group consisting of: (1) machine learning; (2) predictive modeling or analytics; (3) automation of fault detection and diagnostics; (4) automation of process control; (5) automation of maintenance; (6) automation of quality control; (7) welding personnel training; (8) warranty assessment; (9) weldment design optimization; (10) weld equipment design optimization; (11) welding consumables design optimization; and (12) production workflow optimization.

In certain aspects, the large scale dataset further comprises welding equipment maintenance data, weld geometry data, weld quality data, and welding operation productivity data.

In certain aspects, the second welding data includes marking data received via the operator interface, wherein the marking data indicates whether said weld, weldment, or weld process is subject to one or more quality classifications or fault classifications.

In certain aspects, the communication network receives said first welding data and said second welding data in batches or in live streaming format.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION

Figure 1:
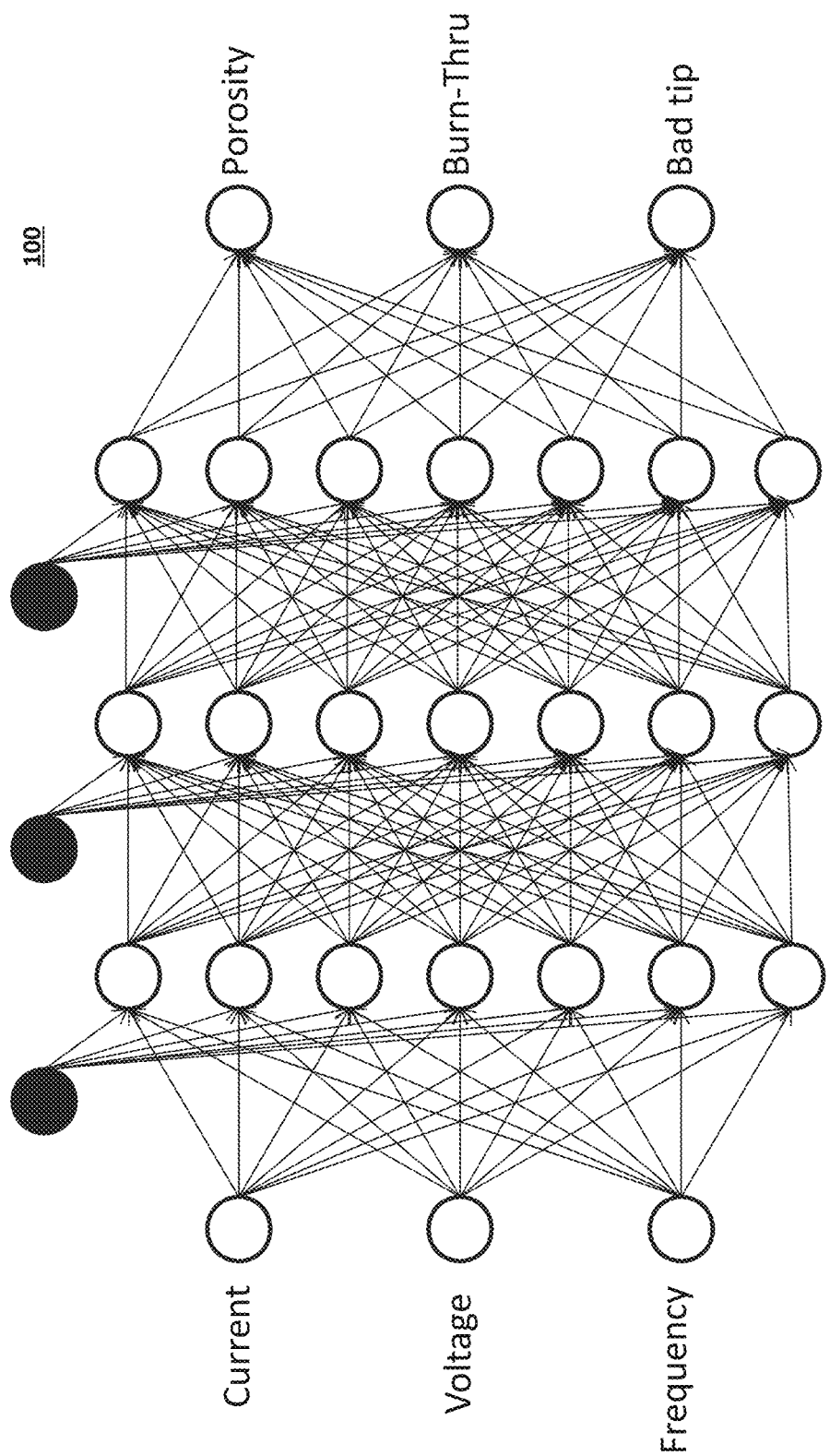
FIG. 1 illustrates example of an artificial neural network corresponding to the earlier input and output vector.

The present disclosure is directed to systems, methods, and apparatuses for facilitating machine learning, data mining, and artificial intelligence in welding fabrication production, in order to automate human decision-making process in welding equipment preventative/predictive maintenance (PPM) and condition-based maintenance (CBM), and weld quality control. Preferred embodiments of the present invention will be described hereinbelow with reference to the figures of the accompanying drawings. In the following description, well-known functions or constructions are not described in detail, since such descriptions would obscure the invention in unnecessary detail.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of "x" and "y". As another example, "x, y, and/or z" means any element of the seven-element set {(x), (y), (z), (x, y), (x, z), (y, z), (x, y, z)}. In other words, "x," "y," and/or "z" means "one or more of "x," "y," and "z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of (i) a connection, whether direct or through one or more other devices, apparatuses, files, circuits, elements, functions, operations, processes, programs, media, components, networks, systems, subsystems, or means, (ii) a communications relationship, whether direct or through one or more other devices, apparatuses, files, circuits, elements, functions, operations, processes, programs, media, components, networks, systems, subsystems, or means, and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, human readable, machine readable, or otherwise manifested. The term "data" is used to represent predetermined information in one physical form, encompassing any and all representations of corresponding information in a different physical form or forms.

The term "database," "data store," and "hash table" as used herein means an organized body of related data, regardless of the manner in which the data or the organized body thereof is represented. For example, the organized body of related data may be in the form of one or more of a table, map, grid, packet, datagram, frame, file, email, message, document, report, list, column-oriented, row-oriented, or in any other form.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "network" as used herein includes both networks and inter-networks of all kinds, including the Internet, intranet, extranet and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, CPLDs, DSPs, application-specific integrated circuits, systems on a chip, systems comprising discrete elements and/or circuits, state machines, virtual machines, data processors, processing facilities, and combinations of any of the foregoing.

To help fabricators improve productivity and quality of their weldments, and to drive continuous improvement in their welding operations, a welding information management system may be employed to collect real-time data from their welding equipment. Using such welding information management systems, fabricators can remotely assess welding performance information in real-time via a computer network (e.g., over the Internet, a local network, etc.). Welding information management systems help fabricators assess performance indicators, such as productivity and quality of the work. For example, welding information management systems may be used to improve a weldment's weld quality by detecting a predetermined characteristic, such as potential weld defects, and by identifying operators associated with the potentially defective weldments. Suitable welding information management systems are available from Miller Electric Mfg. Co. For example, Insight Core™ and Insight Centerpoint™ are Internet-based industrial welding information management solutions that collect and report, for example, arc starts, arc-on time, identify missing welds, and quality performance based on amperage and voltage. Insight Core™ further provides, for example, a real-time snapshot of a weld cell's performance, thereby eliminating outdated and often ineffective methods of manual data collection on the production floor.

Beyond the above-described fleet monitoring of productivity metrics, it is desirable to provide more advanced weld production knowledge systems, which may be provided as secure, remote and/or centralized weld production knowledge systems. The weld production knowledge system may employ one or more predictive models, sometimes referred to as a "hypothesis" to predict the behavior of production control systems such as capabilities, quality, and maintenance in manufacturing based on future unseen production data being monitored as inputs. The construction and refinement of the predictive model employ machine-learning algorithm with set parameters. The data used by a machine-learning algorithm to train a hypothesis is generally referred to "training examples," collectively a "training set". Generally, a model is used to predict an outcome (e.g., a bad tip or burn-thru), while an algorithm is used to build or construct the model, in other words, to "learn" the correlation between inputs and outputs. There are several kinds of predictive models. For example, linear regression models, logistic regression models and neural network models may be used for predictive analytics. In logistic regression or linear regression hypothesis (often denoted as $h_\theta$), parameters are called features (often denoted as $\theta$). In neural network hypothesis, parameters are referred to as hidden units/nodes/neurons/layers/weights.

The machine-learning algorithm may be supervised, or unsupervised. Supervised machine learning algorithms requires that the output of the hypothesis be "labeled," thus each feature is a pair of input (x) and output (y), or $\{(x, y)\}$. For instance, given a particular welding current as input, a resulting weld may be labeled using a binary output (or class) (e.g., either an "acceptable" weld or an "unacceptable" weld). The hypothesis used to classify the resulting weld may be called a classifier. Further, with multiple inputs and outputs (or multi-class), the features are typically vectors. An input vector "x" and output vector training data example is given below. The example input "x" vector has three (3) features, namely root mean squared (RMS) of welding current (230 amp), standard deviation of welding voltage (5.5 V) and short circuit frequency (170 Hz). The example output "y" vector has three (3) classes, namely porosity classified as one (1) or unacceptable, burn-thru classified as zero (0) or acceptable, and bad tip classified as one (1) or contact tip change is needed in production.

$$x = \begin{bmatrix} 230 \\ 5.5 \\ 170 \end{bmatrix} \begin{matrix} \text{current} \\ \text{voltage} \\ \text{shorting frequency} \end{matrix} \text{ and } \text{"}y\text{"} = \begin{bmatrix} 1 \\ 0 \\ 1 \end{bmatrix} \begin{matrix} \text{porosity} \\ \text{burn-thru} \\ \text{bad tip} \end{matrix} \quad \text{Equation 1}$$

Another example of input "x" vector may contain one or more time series data as part of the vector. Welding current time series is notated as $\{I[t]\}=\{I(t), I(t-1), I(t-2), \ldots, I(t-T)\}$ where t is real valued present time, I(t) is welding current sampled at present time, I(t-1) is welding current sampled at one sampling period ($\Delta t$) in the past, and I(t-2) is welding current sampled at two sampling periods (or $2\Delta t$) in the past, and T denotes total delay elements (or memory depth or embedding dimension) as we transform a one dimensional time vector into a T-dimensional spatial vector in constructing time series $\{I[t]\}$ as inputs to neural network. Similarly, welding voltage time series can be notated as $\{V[t]\}=\{V(t), V(t-1), V(t-2), \ldots, V(t-T)\}$. Equation 1 example can potentially take the form of $\{x[t]\}=\{\{I[t]\}, \{V[t]\}, \text{shorting frequency}[t]\}$. The example assumes uniform sampling, however, non-uniform sampling such as exponential trace memory of using past values as exponentially decaying weighed average (i.e. "fading memory but nothing is forgotten") can be used. Additionally, the example assumes feedforward in neural net connections (analogous to finite impulse response digital filter); it is also possible to loop back the predictions $\{y[t]\}$ as part of the input nodes in a recurrent neural network architecture (analogous to infinite impulse response filter). Big Data permits very large memory depth and resolution, nonlinear neural network modeling and longer horizon of time series prediction at acceptable speed of training, testing, cross-validation and prediction.

Conversely, unsupervised machine learning algorithms process unlabeled training data, typically for data pre-processing such as data compression, integration, feature identification, cataloging, transformation or for data clustering and data mining (e.g., Principle Component Analysis or PCA, clustering such as clustering by k-means, hierarchical, conceptual, probability-based and Bayesian). One example of data clustering analysis is to identify batch-to-batch differences in manufacturing. Another example is anomaly detection in weld quality or equipment condition or usage or imminent failure; or welding consumables such as gas, wire, flux, tip, nozzle and liner; or parts being welded; or weld fixture being used. Yet another example is the grouping of trained/skilled/certified/high performing weld operators from novice/underperforming/un-certified weld operators. Yet another example is the detection of any deviation from weld procedure specification (WPS). Yet another example is the clustering of user interactions or interface usage behavior with the machine to improve user experience customized for certain groups of users or welding applications.

Weld production knowledge machine learning algorithms may be used to predict and/or identify predetermined characteristic of said at least one weld, such as, inter alia, weld bead shape, weld penetration, defects and discontinuities in visual, UT, the radiographs, metallurgical and mechanical properties of the weld (and the heat affected zone), weldment distortion, residual stress, etc. Weld production knowledge machine learning algorithms may also predict tool consumable life (e.g., gas metal arc welding (GMAW) contact tip, nozzle, liner, drive roll, weld cable etc.). The weld production knowledge machine learning algorithms may employ one or more of statistical models, artificial neural networks (ANN), fuzzy logic, support vector machine (SVM), and/or knowledge-based expert systems. Generally, an advantage feature of predictive analytics in weld quality is to identify defects, or other problems, in the factory. Indeed, it is much more cost effective to address any issues at the factor than it is to recall defective fabricated products when such fabricated products are in the field.

Weld production knowledge machine learning algorithms may be used to predict and/or identify predetermined characteristic of said welding equipment or welding personnel, such as, inter alia, tool life, weld quality (e.g., passing or failing the WPS or compliance with production specifications), weldment quality, weld tool consumable life, welding equipment (and its component), service condition/interval, welding equipment reliability such as MTTR/MTBF, decisions and actions by weld personnel, worker training needs/performance/error/skill, welding consumable usage/replenish pattern, welding fixture service condition, anomaly in welding materials and supplies/input power or fuel/welding conditions/pre-weld and post-weld operations, productivity of weld, pre-weld and post-weld operations such as parts per shift/weld cell cycle time/production yield.

An example of an ANN 100 corresponding to the vector of Equation 1 is shown in FIG. 1 with three (3) hidden layers. Each hollow circle denotes a neuron, each solid circle denotes a bias, and each line has a unique weight. The biases and weights are parameters of the ANN 100. To mitigate false positives and/or false negatives, however, a set of rules associated with an algorithm would historically be configured and conditioned for a specific application.

Existing weld quality assurance systems suffer from certain limitations. First, it is not easy to "label" the data. It is labor intensive to train a machine-learning algorithm, especially a higher performance classifier. Human error on data input is another concern. Second, the output data (or class) is often skewed towards normal behavior where the quantity of samples associated with anomalies (e.g., a bad contact tip, a weld defect, etc.) is much smaller than the quantity of samples for acceptable behavior (e.g., an operational contact tip, acceptable welds, etc.). Third, machine-learning algorithms require substantial trial and error. The labor-intensive nature limits the size of the training set, which in turn requires a high bias in technique, such as in neural network, and renders the machine-learning algorithm less accurate. Fourth, large training set and/or complex machine learning algorithm are computationally expensive to implement at each welding station. Fifth, welding application conditions may change overtime, thus reducing the accuracy of the machine-learning algorithm on a sustainable ongoing basis. For example, new parameters may be required if the fabricator changes the source/supplier of a particular component (e.g., a change of stamping lubricant of the stamped components of the sheet metal work pieces in an automotive production factory may cause weld porosity in weld stations). While a complex, higher accuracy, neural network system with low bias and more inner layers may be used in order to mitigate false positives (and even false negatives), such systems are fiscally expensive, very slow, and computationally expensive to run back propagation in neural network learning. For example, a 100 feature cubic regression hypothesis model with Sigmoid function for classification could have 170,000 parameters to learn. Assume the following learning algorithm is used to train hypothesis $h_\theta$ to predict weld quality in a typical automotive plant with 100 welding arcs using linear regression:

Repeat {
$$\theta_j := \theta_j - \alpha \frac{1}{m} \sum_{i=1}^{m} (h_\theta(x^{(i)}) - y^{(i)}) x_j^{(i)}$$
(for every $j = 0, ..., n$)
}

Equation 2 where $\alpha$ denotes learning rate, h denotes hypothesis and $\theta$ denotes feature under training. In a 30-day training effort of 16 arc hour per day, one second of just one welding signal per training sample, the dataset size m amounts to a massive 172 million. It is estimated that on a weekly basis, a single industrial equipment produces 5 GB of parameters and error logs data, 10 GB of event data, and 750 GB per lot of defect images from vision inspection. Most computers available on fabricators shop floor cannot handle file sizes of this magnitude. In an economical example, Lappeenranta University of Technology (LUT)'s self-learning neural network for GMAW welding costs about 800,000 euros, which is likely to be unaffordable to most fabricators, especially on a per arc basis. Fifth, due to the cost of large dataset for training, conventional datasets are typically small, which renders the hypothesis vulnerable to a so-called overfitting problem in constructing complex hypothesis with limited dataset. Accordingly, providing weld production knowledge has been historically highly application specific and, in many cases, it has been difficult to establish acceptable and enduring predictive accuracy without lengthy and costly experiment on site.

The present disclosure, however, provides a solution that overcomes the forgoing obstacles by employing, inter alia, a dynamically generated large-scale dataset with matching computing power to process it economically. Thus, as will be described, to address the above-described deficiencies, an online, low bias large neural network can be continuously trained using a large-scale dataset to achieve heightened accuracy. However, as also noted above, manually generating large scale datasets results in delays and inefficiency. To address such delays and inefficiency, an object of the subject disclosure is to depart from conventional approaches of machine learning algorithms training using a costly controlled small dataset, to a new paradigm of machine learning algorithms training using a large scale dataset that is dynamically generated from actual welding equipment in production with network connectivity and from actual quality control and maintenance activities in a factory. In other words, as disclosed herein, a weld production knowledge machine learning algorithm may be trained by a large scale dataset of actual welding process data collected continuously in real-time from real life welding equipment in production (e.g., on-line) at one or more welding cells of a fabricator, and at one or more fabricator sources, and by actual weld quality data from real life inspection equipment, and using actual quality standards of pass/fail from fabricators themselves, which may be integral with fabricators' quality control system. In other words, the data labeling of supervised learning (e.g. weld quality or weld equipment maintenance conditions) is not done generically in controlled experiments for all applications but can be customized and based on actual human decisions specific to each application.

As will be appreciated, a quality assurance system, and its weld production knowledge machine learning algorithm, yield reduced costs and increased computationally efficiency by obviating the need for the costly training of complex neural network systems. For example, the welding process data, weld quality data, and any other pre-welding and post-welding human (e.g., operator ID), material (e.g., heat number, batch number) and operational (e.g., post weld heat treatment) data regarding the weldment (collectively, "welding data") dynamically collected from one or more welding stations may be used to generate and maintain the large scale dataset, which may then be used with the low bias large neural network. Further, manual labor historically needed to identify new features needed to detect an anomaly, or PCA data compression, can be replaced by more computationally intense multivariate normal distribution (i.e., multivariate Gaussian distribution) for automatic capturing and correlation of raw data to features suitable for hypothesis training. Indeed, high variance can be a common problem with welding data; however, a large-scale dataset will close, or reduce, the gap between any cross-validation error and training set error. In certain aspects, the quality assurance system may employ stochastic gradient descent, or mini-batch gradient descent, to scale a given dataset up to the large-scale dataset. Accordingly, an unsupervised learning algorithm may be used to detect anomalies in welding operations, such as those in weld quality, in arc time pattern (active welding), in idle time (nonproductive) pattern, in equipment duty cycle pattern, in input power consumption and fluctuation pattern, in welding consumable consumption patterns, and in usage pattern on the functions available from the welding equipment (e.g., a welding power source may provide hundreds of weld programs or functions. Data mining enables clustering of the popular functions with respect of certain welding applications), and reliability pattern of components or system from large set of welding equipment. Such unsupervised learning algorithms may also predict spatter, fume, defects, arc stability, distortion, microstructure, residual stress, corrosion, creep, fatigue, metallurgical properties, and other mechanical properties.

Depending on the needs of a particular fabricator, the large-scale dataset may be configured to include all available welding data, regardless of fabricator source, or to be limited to welding data collected from a specific fabricator (or category of fabricators). For example, a particular fabricator who deals in very precise welding may desire to use only welding data generated by that particular fabricator (or, in certain aspects, other comparable fabricators) so as to ensure that the particular fabricator's heightened metrics are used to support the quality assurance algorithm, which would in turn identify acceptable/unacceptable weldments. Conversely, if a fabricator deals with very general welding, where larger deviations from ideal attributes are deemed acceptable, the fabricator may use welding data generated by any and/or all available fabricators so as to provide an even larger scale dataset, thereby increasing accuracy of the algorithm.

Figure 2:
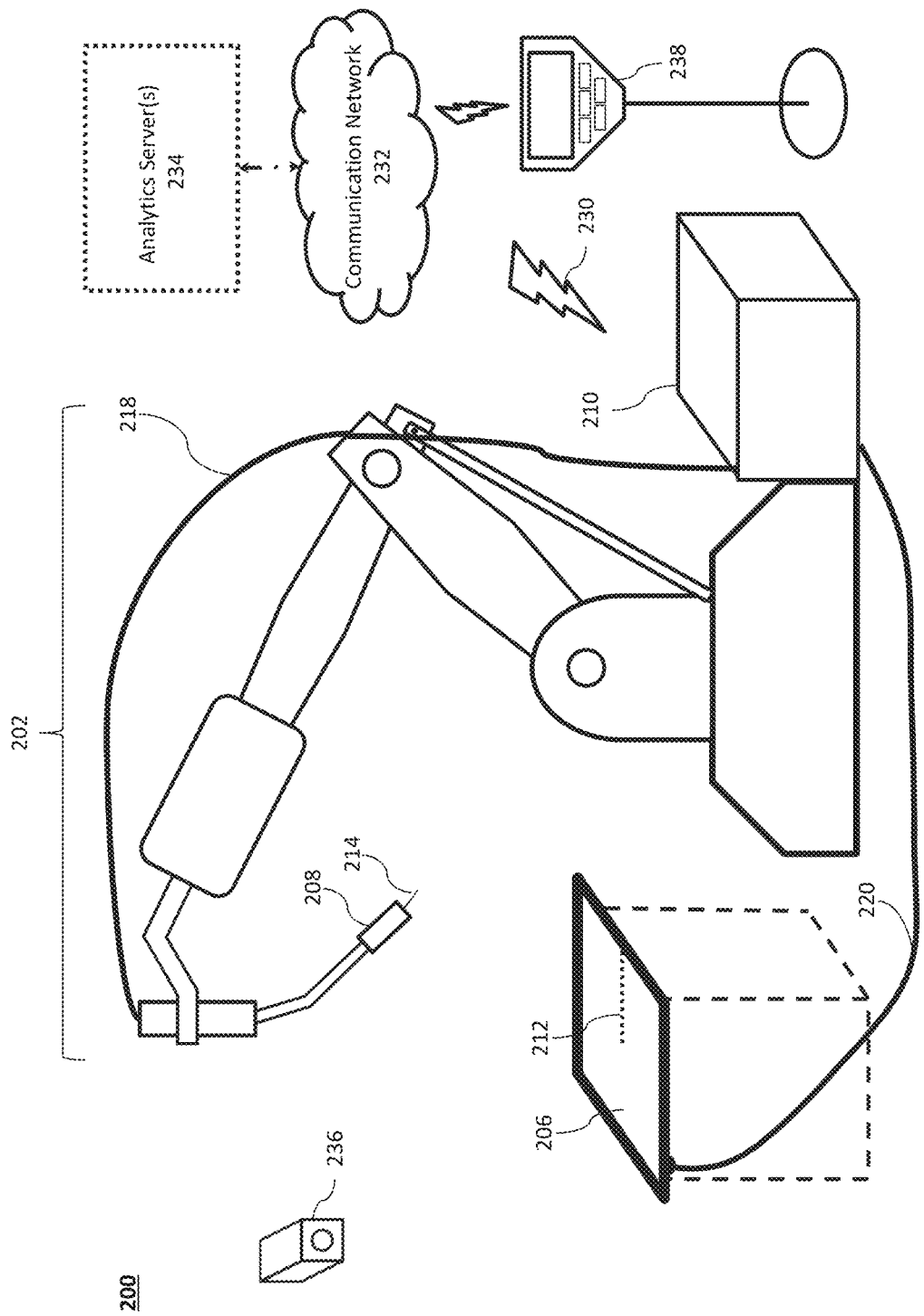
FIG. 2 illustrates an exemplary robotic arc welding system in accordance with an aspect of this disclosure.

Referring to FIG. 2, an example welding system 200 is shown in which a robot 202 welds a work piece 206 using a welding tool 208 (or, when under manual control, a handheld torch) to which power or fuel is delivered by welding equipment 210 via conduit 218 (for electrical welding, ground conduit 220 provides the return path). The welding equipment 210 may be communicatively coupled with one or more analytics computing platforms 234 (e.g., one or more big data analytics computing platforms at a data center, which may be remotely situated) via a communication link 230 and a communication network 232.

One or more sensors 236 may be positioned throughout a welding station to measure and collect welding data. For example, depending on the type of sensor, the one or more sensors 236 may be positioned adjacent the work piece 206, integrated with the welding equipment 210, integrated with the welding headwear, or a combination thereof. Indeed, the one or more sensors 236 may be positioned adjacent (e.g., operably situated) the work so as to enable to one or more sensors 236 to properly function. For example, a camera should have a line of sight to the weld, a microphone should be close enough to detect acoustic features of the weld, or weld process, etc.

The welding equipment 210 may comprise a power or fuel source (generally referred to herein as a "power supply"), optionally a source of a shielding gas and, where wire/filler material is to be provided automatically, a wire feeder. Although a wireless link is illustrated between the welding equipment 210 and the communication network 232, and between the operator interface 238 and the communication network 232, the link may be wireless, wired, and/or optical. The communication network 232 may include device-to-device communications, e.g., from 210 to 238 in FIG. 2 using BLUETOOTH®, ZIGBEE®, Ethernet, ETHERCAT®, PROFINET®, PROFIBUS®, DEVICE-NET®, MODBUS®, P2P, sensor networks, Private Internet Protocol (PIP), connectivity to extranet network, MQ Telemetry Transport (MQTT), MQTT for Sensor Networks (MQTT-SN), Constrained Application Protocol (CoAP), REpresentational State Transfer (REST) architecture, etc.; and device-to-network communications, e.g., from 238 or 210 to 234 using Wi-Fi, Ethernet, LTE (cellular), MANET, LAN, WAN, etc. The network architecture may be distributed or under-organized fog network rather than controlled by network gateways. The communication network 232 may contain edge devices, switches, gateways, VPN, firewall, mobile cellular network, and other networking means to connect factory equipment residing in manufacturing subnets to big data analytics computing platforms residing in the cloud infrastructure. The communication network 232 may incorporate cyber security means such as SSL, TLS, HTTPS, user authentication and authorization, and secure REST API interfaces for cloud data access, storage, and exchange.

The welding system 200 of FIG. 2 may be configured to cut material (e.g., as a plasma cutter) or form a solder or brazed joint, form a weld (e.g., weld joint 212) between two components in a weldment by any known welding technique, including flame welding techniques (such as oxy-fuel welding) and electric welding techniques (such as shielded metal arc welding (SMAW), more commonly known as stick welding), metal inert gas welding (MIG), flux cored arc welding (FCAW) tungsten inert gas welding (TIG), laser welding or cladding or additive manufacturing, sub-arc welding (SAW), stud welding, friction stir welding and resistance welding. TIG welding may involve no external filler metal or may involve manual, automated, or semi-automated external metal filler, either cold or pre-heated. Optionally in any embodiment, the welding equipment 210 may be arc welding equipment that provides a direct current (DC) or alternating current (AC) to a consumable or non-consumable electrode 214 of a welding tool (e.g., welding tool 208), which may be a TIG torch, a MIG torch, a flux cored torch (commonly called a MIG "gun"), or a stick electrode holder (commonly called a "stinger").

In operation, the electrode 214 delivers the current to the point of welding on the work piece 206 (e.g., a weldment). In the welding system 200, the robot 202 controls the location and operation of the electrode 214 by manipulating the welding tool 208 and triggering the starting and stopping of the current flow. When current is flowing, an arc is developed between the electrode 214 and the work piece 206, which ultimately becomes a weldment. The conduit 218 and the electrode 214 thus deliver current and voltage sufficient to create the electric arc between the electrode 214 and the work piece 206. The arc locally melts the work piece 206 and welding wire (or rod) supplied to the weld joint 212 (the electrode 214 in the case of a consumable electrode, or a separate wire or rod in the case of a non-consumable electrode) at the point of welding between electrode 214 and the work piece 206, thereby forming a weld joint 212 when the metal cools. A plasma cutter operates in a similar fashion. Specifically, an inert, or blended, gas is blown at high speed out of a nozzle, while an electrical arc is formed through that gas from the nozzle to the work piece 206 being cut, turning some of that gas to plasma. The plasma is hot enough to melt the work piece 206 being cut and moves fast enough to blow molten material away from the cut.

As illustrated, the one or more sensors 236 may be positioned throughout the welding station (a/k/a weld cell) to measure and collect welding data, which may be used for weld production knowledge purposes. For instance, the one or more sensors may be positioned adjacent the weld and/or operable to capture one or more attributes of a weld (e.g., physical features of the weld) and/or one or more parameters of the weld (e.g., settings used when forming the weld), whether during fabrication of the weld or upon completion of the weld. The one or more sensors or transducers 236 may include any sensor useful in identifying defects, or measuring attributes/parameters, of a weld in a weldment. Examples of suitable sensors include, without limitation, current/LEM sensor, voltage and power sensors/calorimeter, encoders, photodiodes, cameras, microphones, seam finders, temperature sensors (e.g., positioned inside the welding equipment 210, or on the work piece 206), infrared (IR)

detectors, proximity sensors, laser ranging and scanning devices, pressure sensors, inertial sensors, humidity sensors, airflow sensors, inertial measurement unit (IMU) sensors, shape memory alloy (SMA) sensors, piezoelectric sensors, nanotechnology chemical sensors, EMAT sensors, MEMS sensors, GPS, etc. In certain aspects, some of the one or more sensors 236 may be integral with, or coupled to, the welding equipment 210 and configured to measure and/or provide, for example, the arc current, wire drive current, arc voltage, power source input line voltage, tracker output, switch mode power source, pulse width modulation pulse width, or another parameter of the welding equipment 210. In certain aspects, as will be discussed below, the output from the one or more sensors 236 may be stored to a non-transitory medium for later analysis, where the data may be communicated in batches to a remote analytics system.

A first operator interface 238 may be provided at the welding station that enables welding personnel (e.g., a welding operator, a supervisor/manager, maintenance personnel, quality control personnel, etc.) to indicate, or enter, any equipment fault classification, set points, set up conditions, quality classification, and/or other parameters. In some aspects, certain of the parameters (e.g., weld programs, set points, set up conditions, etc.) and fault or event codes may be transmitted from the robot and/or welding equipment 210 to the analytics computing platform 234 as input features or automatically detected/sensed, thereby obviating the need for welding personnel to manually indicate at least those parameters. The parameters and fault or event codes etc. may be transmitted with tags associated with work piece 206 and other related information for traceability as in metadata for later processing. The first operator interface 238 is preferable a computing device (e.g., a computer, laptop, tablet, smart phone, etc.) with network connectivity.

The set points may indicate, for example, weld program number, commanded wire speed, arc voltage or length, arc current, laser power, weld tool travel speed and angles, weld time and length, etc. The set up conditions may indicate, for example, laser type and mode, wire type and size, shielding gas type, flux type, power supply waveform type, etc. The fault classification may include one or more of, for example, torch fault, wire fault, gas fault, weld cable fault, communications fault, sensor fault, robot fault, fixture fault, safety device fault, power supply fault, wire feeder fault, chiller or cooler fault, reamer fault, tool changer fault, etc. In certain aspects, a tree of specific fault classifications can be provided under each system component. Under torch fault, for example, the operator can further specify one or more of, inter alia, loose tip, incorrect size tip, eroded tip, tip with spatter blocking exit, bent tip, blocked gas diffuser, worn shielding gas nozzle, bad weld cable connection, etc. The quality classifications may comprise one or more of, for example, a missing weld, misaligned weld, weld is too large or too small (i.e., deviates from a predetermined acceptable range), porosity, undercut, burn thru, lack of fusion, failed bend test, failed tensile test, failed fatigue test, failed Charpy test, distortion out of spec, work piece discoloration, etc.

While the operator interface 238 is illustrated in FIG. 2 as a standalone device that is communicatively coupled to the communication network 232, the operator interface 238 may be integrated with, or otherwise coupled to, the welding equipment 210 (e.g., as described with regard to operator interface 510), the robot 202, or another device. In certain aspects, the operator interface 238 may even be remotely situated and accessible via the communication network 232. For example, a second operator interface 238 may be provided for a quality inspector (or other welding personnel) to enter any quality classification of the weldments, and/or whether a weld is deemed by to be "acceptable" or "unacceptable" (whether manually inputted, or automatically determined from quality assurance equipment measurements) and label specific pass/fail result per quality inspection criteria. The second operator interface communicates via communication network 232 to analytics computing platform 234.

Any data entered via the operator interface 238, or generated by the one or more sensors 236, is preferably traceable back to the raw data collected by the one or more sensors 236 regarding the weldment, which could also identify the weldment, the operator, etc. The welding equipment 210 may be configured to communicate the welding data to the analytics computing platform 234 via the communication network 232 for processing, while still preserving traceability to the weldments. Through the communication network 232, the welding equipment 210 may also be configured to report programmed set points and set up conditions to the analytics computing platform 234.

In certain aspects, in lieu of a robot 202's robotic arm, a human operator may control the location and operation of the electrode 214. For example, an operator wearing welding headwear and welding a work piece 206 using a handheld torch to which power or fuel is delivered by welding equipment 210 via conduit 218. In operation, as with the system 200 of FIG. 2, an electrode 214 delivers the current to the point of welding on the work piece 206 (e.g., a weldment). The operator controls the location and operation of the electrode 214 by manipulating the handheld torch and triggering the starting and stopping of the current flow via, for example, a trigger. A handheld torch generally comprises a handle, a trigger, a conductor tube, and a nozzle at the distal end of the conductor tube. Applying pressure to the trigger (i.e., actuating the trigger) initiates the welding process (or cutting process, where applicable), whereby output power is provided, and the wire feeder 506, and/or the gas supply module 508 are activated as needed.

In addition to, or in lieu of, the one or more sensors 236 that may be positioned throughout the welding station, certain of the one or more sensors 236 maybe integral with, or coupled to, the welding headwear. For example, one or more cameras may be provided on the welding headwear. Each of the one or more cameras may comprise, for example, one or more lenses, filters, and/or other optical components for capturing electromagnetic waves in the spectrum ranging from, for example, infrared to ultraviolet. In an example implementation, two cameras may be positioned approximately centered with the eyes of a wearer of the welding headwear to capture high dynamic range images (e.g., 140 dB+) and stereoscopic images (at any suitable frame rate ranging from still photos to video at 30 fps, 100 fps, or higher) of the field of view that a wearer of the welding headwear would have if looking through a lens.

Figure 3B:
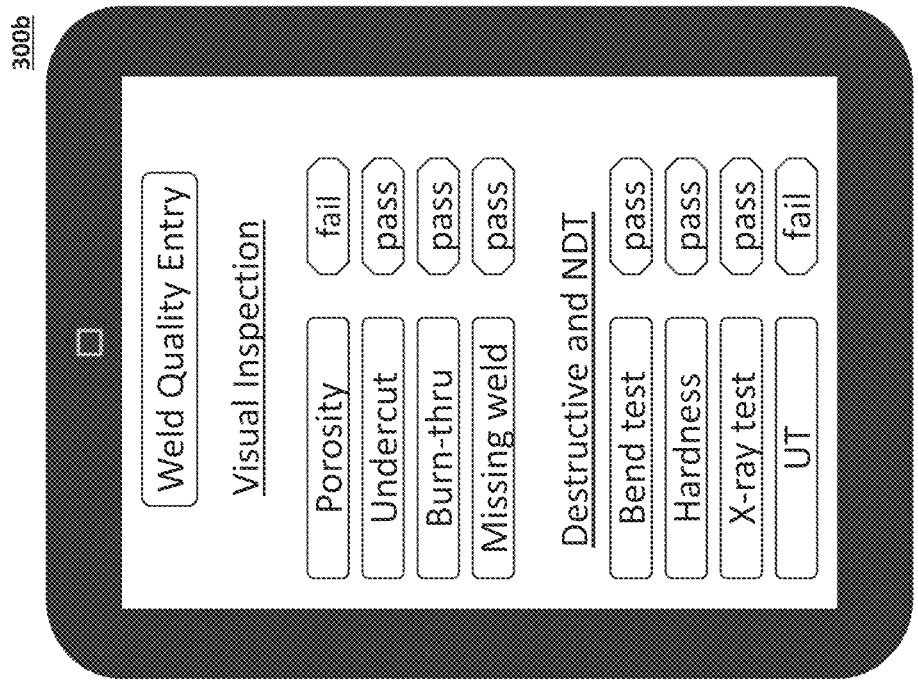
FIGS. 3a and 3b illustrate example screen shots of a downtime user interface and an inspection user interface.
Figure 3A:
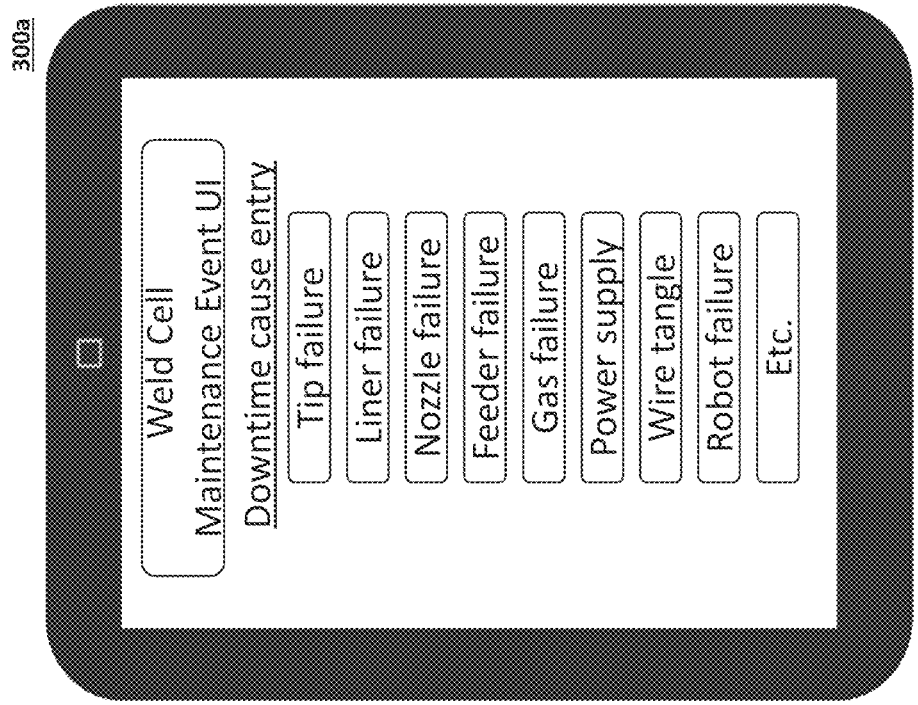

FIGS. 3a and 3b illustrate example screen shots of a downtime user interface and an inspection user interface. Specifically, a screen shot of an example downtime user interface 300a is illustrated in FIG. 3a, while a screen shot of an example inspection user interface 300b is illustrated in FIG. 3b. For example, the downtime user interface 300a, which may be situated at the welding cell 406, may enable welding personnel to indicate one or more downtime causes, such as tip failure, liner failure, nozzle failure, feeder failure, gas failure, power supply, wire tangle, robot failure, etc. Similarly, inspection user interface 300b, which may be situated at the inspection station 408, may enable welding personnel to indicate one of more quality issues (or measurement values) based on visual inspection and/or testing (whether destructive of non-destructive testing (NDT)). The quality issues may relate to, for example, porosity, undercut, burn-thru, missing weld, bend test, hardness x-ray test, ultrasonic testing (UT), etc. The user interfaces 300a, 300b may be provided as part of operator interface 238, 510, or another computer device communicatively coupled with the communication network 232 (e.g., computer, laptop, tablet, smart phone, etc.).

With reference to FIGS. 4a through 4d, example welding process systems are illustrated where the welding cell 406 records the raw welding process signals and data from the sensors in the welding operation, and transmit the features (x) along with tag data (or weld process metadata) to a central location, e.g., analytics computing platform 234 via a communication network 232. As illustrated, the work-in-process weldment (e.g., a carrier 402) may be tagged with a tag 404, which may be used to identify and track the weldment. When the work-in-process weldment arrives at an inspection station 408, a quality assurance device (e.g., tensile machine 410a, computing device 410b, etc.) may classify the weldment as passing (or failing) in one or more aspects of routine tests and communicate the test results (y1, y2) along with tag data (or weld quality metadata) to the analytics computing platform 234. Analytics computing platform 234 will combine the "x" and the "y" (e.g., {(x, tag)} and {(y1, y2, tag)}) data together to form a complete training example {(x, y)}. For example, "x" may be a vector of all the sensors of welding process and equipment, while the "y1" vector may include fault codes, events and error logs from networked welding machines & robots & PLCs that can be digitally and automatically transmitted, but "y2" may be a human interface for manual entry by the maintenance personnel when he recovers the fault (such as those described with regard to FIGS. 3a and 3b). The "x," "y1," and "y2" data may be further time stamped so that when they reach the analytics computing platform 234, a pre-processor can parse and assemble them into dataset before ingesting them into machine learning algorithms of the one or more analytics computing platforms 234 for training, validation and testing. The data transmitted by the welding cell 406 and inspection station 408 include metadata with "tags" or supplemental information such as weldment traceability, time and location data attached to the weld process data, welding equipment maintenance data and weld quality data. The data may be in human readable forms such as XML or JSON. Alternatively, it may be binary or machine-readable only. In certain aspects, data transmitted by 406 may be encapsulated by a content neutral wrapper to accommodate other formats. In certain aspects, the data may be formatted into a standardized or structured form. For example, a wrapper may be employed, which, extracts content of a particular information source and translates it into, for example, a relational form.

Another implementation is to store "x" directly in the tag 404 to be carried by the WIP weldment to arrive at the inspection cell. At inspection cell, the "x" is combined with "y" and transmitted out to the analytics computing platform 234. The analytics computing platform 234 may also be communicatively coupled with one or more other data sources 412 (e.g., fabricators, distributors Enterprise Resource Planning and service or supply management records, etc.) via the communication network 232. The inspection station 408 may digitally and automatically record "y1" by networked instruments, or, in certain aspect, rely (at least in part on) manual entry of "y2" by a human inspector via weld inspection operator interface 238. Any cause of downtime between the welding cell 406 and the inspection station 408 may be input by the operator via the weld Inspection Operator interface 238, such as a downtime user interface 300a. A screen shot of an example downtime user interface 300a is illustrated in FIG. 3a, while a screen shot of an example inspection user interface 300b is illustrated in FIG. 3b.

The traceability can be facilitated using the tag 404, which may be a memory device, a radio-frequency identification (RFID), a near field communication (NFC) device, an optically scanable image (e.g., Quick Response (QR) code, barcode, etc.), or other device affixed to the work piece 106 or carrier 402, or a memory component of the carrier 402 of the work piece as the work piece progresses down the production line (e.g., from the welding cell 406 to inspection station 408). One example implementation of the RFID tag is Beweis RFID tag that lets inspectors identify the weld data (x) (e.g., date, serial number, GPS coordinates, pipe diameter, operator name etc.) associated with the pipe welds and their corresponding radiographs (y) in Areva nuclear power plants and petrochemical facilities. Because "x" and "y1"/"y2" are acquired at separate times and in different locations, the tag 404 may be used to link the "x" and "y1"/"y2" together during cloud integration of data, thereby providing traceability. In certain aspects, the data collected from a manufacturer may be discarded upon completion of the algorithm training, cross-validation, testing. Such a procedure may be advantageous in that it can address any data security concerns of the fabricator, or other customers.

The welding process system may be configured to automatically scan (or otherwise identify) the work piece 206, or the operator may manually scan or identify the work piece using, for example, a hand held scanner or other user input device (e.g., operator interface 238, 510). Indeed, with operator identification being available as part of the welding data collected in the welding station, classification of operators based on a correlation with the weld quality may be readily accomplished, which may be useful in identifying training opportunity in a fabricator, such as those relying heavily on manual and/or semi-automatic welding.

In at least one aspect, the analytics computing platform 234 facilitates the weld production knowledge system, which may employ one or more weld production knowledge machine learning algorithms, of which certain portions may be centralized. In certain aspects, the weld production knowledge system may be substantially centralized where the analytics computing platform 234 is configured to perform all calculations, algorithm training, and other processes based on, for instance, raw data received from equipment (e.g., welding systems) situated at one or more fabricators over the communication network 232. In another aspect, the weld production knowledge system may be distributed where different processes are performed at different locations throughout a given system. The data labeling for example, may be performed locally at the fabricator (e.g., where welding operation or quality control takes place). The algorithm training, for example, may take place at a remote server at an analytics computing platform 234. The algorithm for pre-processing, for example, data staging, cleaning, scaling, linearization, aggregation, filtering, smoothing, compression, integration, feature identification, cataloging and transformation. Software tools such as extract-transform-load (ETL) and metadata management may be used to collect, clean, pre-process, aggregate raw data from their sources and move them to operational data store, data vault, repository or data warehouse. Another pre-processing example is for data compression using PCA or computing the raw voltage data into standard deviation of voltage as a feature, could take place locally at the fabricator before it is transmitted to a centralized server at the analytics computing platform 234.

Figure 4A:
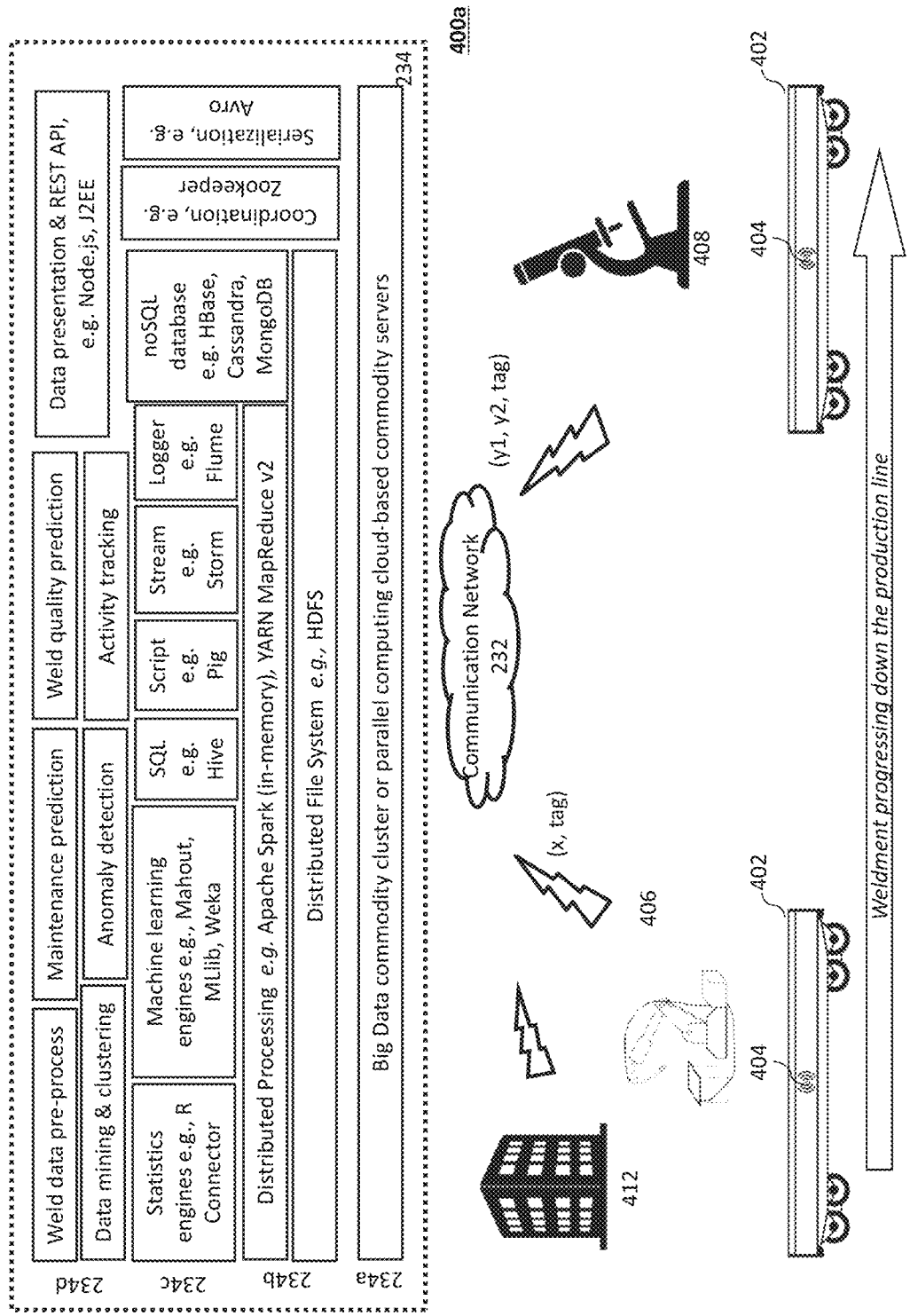
FIG. 4a illustrates an example overall system architecture of cloud based machining learning for welding.

Turning to FIG. 4a, FIG. 4a illustrates example overall system architecture 400a of cloud based machining learning system for welding. As illustrated, the one or more analytics computing platforms 234 provide three layers (e.g., bottom layer 234a, middle layer 234b, upper layers 234c and 234d) to facilitate a cloud framework using, for example, an APACHE™ HADOOP® ecosystem at the analytics computing platform 234.

The APACHE™ HADOOP® ecosystem is a cost-effective platform for scalable and fault tolerant big data management, an open source framework and ecosystem built upon MapReduce parallel processing, distributed file system (HDFS) and a suite of related open source software projects, systems and infrastructure designed for big data. The APACHE™ HADOOP® ecosystem runs on low cost commodity computers called commodity clusters. The bottom layer 234a provides the example cloud hardware and software of HADOOP® cluster with cloud controller, cluster controllers, and node controllers, which may use EUCALYPTUS tool (acronym for Elastic Utility Computing Architecture Linking Your Programs To Useful Systems) or OPENSTACK® software on virtualized computers. The bottom layer 234a facilitates cloud services to store and retrieve all essential data about the static and the dynamic components of machine learning objects. The middle layer 234b can facilitate computational services for distributed processing and file system associated with big data. For example, MapReduce allows large dataset being sub-divided into smaller parts and processed independently and in parallel by map tasks, with intermediate (key, value) pairs sent to reduce tasks to be grouped into results.

APACHE™ HADOOP® MapReduce may employ, for example, MapReduce 2.x (MRv2) or YARN. As an alternative to HADOOP® MapReduce, APACHE™ SPARK™, which has a higher speed, may be used for repeated access to the same data in-memory on the cluster. APACHE™ SPARK™ employs distributed machine learning framework on top of the Resilient Distributed Dataset (RDD) in-memory cluster computing or distributed memory-based cluster computing framework. APACHE™ SPARK™ can run standalone or on top of HADOOP® YARN, where it can read data directly from the HADOOP® Distributed File System ("HDFS"). HDFS may be used for storing large files in small blocks (e.g., 64 MB or 129 MB) and replicating the blocks in multiple servers. Multiple HBase tables (or datastore) may provide the data column families for upper layer 234c machine learning application engines to analyze. For example, HBase tables may be organized by various welding fabricators; or may be further organized by data type such as welding equipment signals table, robot fault and event log table, welding quality inspection test report data table, maintenance and service record table, fabricator manufacturing data table from core enterprise or manufacturing information system (e.g., SCADA, MES, or ERP) relational database, etc. The upper layer 234c may facilitate application layer services or virtual machines. A pre-process service may be used to handle heterogeneous data fed from multiple welding fabricators, locations and timestamp, machines, instruments and data sources; and with various data format; and is further explained with reference to FIG. 4c. APACHE™ Spark may be better suited for pre-processor services in the iterative computations on the same data to transform and integrate heterogeneous data sources related to welding.

The machine learning application engine virtual machine can use MAHOUT™ and/or MLlib implementations of distributed and/or scalable machine learning algorithms or libraries. Java-based WEKA® open source ML software can be used for data mining. Alternatively ad-hoc machine learning algorithms can be provided, which may be developed using, for example, R Connector, SAS® software, MATLAB®, Octave, etc. The algorithms may be built on the APACHE™ HADOOP® cloud computing layers below. For example, the machine learning engines like MAHOUT™ libraries/MLlib WEKA® can use MapReduce paradigm to perform supervised learning and unsupervised learning for hypothesis training, validation and testing; and to provide services such weld quality prediction, maintenance prediction and data mining (for unexpected anomaly detection and alarm). Layer 234 may also include APACHE™ HIVE™ data warehouse with SQL-like interface, APACHE™ Pig scripting, APACHE™ Storm for time series weld data streaming, APACHE™ Flume for logging weld equipment events and faults, and NoSQL databases such as HBase, CASSANDRA™ or MONGODB®. Coordination services are provided by ZOOKEEPER™ and serialization services are provided by AVRO™ between layer 234b and 234c. One example is to run supervised learning algorithm to train hypothesis $h_\theta$ to predict weld quality shown in Equation 2. OLAP virtual machine service or online analytical processing of streaming data could be provided, e.g., with MonetDB open source system for efficient complex queries against large databases. In addition, a recommender service may be provided based on collaborative filtering such as k-nearest neighbor (k-NN). It is possible for example to predict the weld quality benefit or welding equipment service benefit of a Regulated Metal Deposition (RMD) or Controlled Short Circuit (CSC) welding process from one plant of a fabricator to another plant using similar welding process and requirements. In addition, application servers or app servers may provide MATLAB® or Octave application services or shell scripts (e.g. supervised learning such as LVQ, NARX and RNN; unsupervised learning such as self-organizing maps and competitive layers; and deep learning such as convolutional neural net and auto encoders) to MATLAB® or Octave operators located remotely at the labor center 602, which may include one or more of machine learning analysts, weld engineers, plant engineers, test/quality assurance engineers, production control engineers, etc. Scale economics can be realized by networked welding fabrication cells, networked welding inspection cells, and centralized data analytics in the cloud and centralized labor (e.g., welding engineers and machine learning analysts) at remote, low-cost sites. For example, application servers may allow remote method invocations of MATLAB® neural network toolbox, parallel computing toolbox and apps for data-fitting, pattern recognition and data clustering and Simulink blocks for building and testing neural networks operating on data served from MATLAB® distributed computing server on AMAZON'S® Elastic Computing Cloud EC2 with Lambda architecture.

Web portals at this upper layer 234c and 234d may be also provided for data capture, for maintenance, quality assurance and weld engineers at fabricator locations, and for displaying real time weld quality and weld equipment service prediction results and notifications on user interface 238, 300a, 300b, 410a (PC) and 410b. The data presentation services may use, inter alia, REST API, Node.js, J2EE, Web 2.0 technologies, HTML5 and may be powered by APACHE™ Axis library and APACHE™ TOMCAT® Web container with Java servlets/JSPs frontend. Also included (but not illustrated) is an administration and usage metering virtual machine. The administration and usage metering virtual machine enables a "pay as you go" business model, more specifically; pay based on quality of good weld produced at certain productivity if the "service business model" transforming fabricators from paying welding consumable and upfront equipment capital to paying based on quality weld produced. The services for fabricators illustrated in 234d layer include maintenance prediction, weld quality prediction, anomaly detection, and activity tracking in a manufacturing and production environment. The architecture described in FIG. 4a is operable to analyze general-purpose or welding application agnostic components, comprising of sensors, user interfaces, databases and processing circuitry deployed inside a fabricator's factory not specific to any welding application and can be configured by a fabricator to acquire any welding related information unique to each fabricator. The cloud computing framework (commodity cluster and HADOOP® and welding applications, for example) is also made of general-purpose components, and the machine learning algorithm will be trained, tested and deployed in a generic way (using fabricator selected inputs and outputs). To a fabricator, the welding system can be "customized" for its purpose. However, from implementation of service provider's perspective, the welding system operates to minimize ad hoc human labor needed to customize algorithms for specific welding application for each fabricator. This provides a cost-effective solution for customized machine learning in welding applications. Although the above architecture describes an implementation of cloud architecture using HADOOP® based public cloud (AMAZON® Web Services, GOOGLE® Compute Engine, and MICROSOFT® Azure), elements of commercial implementation or paradigm or distributed machine learning framework can be considered or combined for welding predictive data services, such as Cloudera Enterprise with its CDH (Cloudera Distribution Including APACHE™ HADOOP®) distribution, MICROSOFT® Azure ML, IBM WATSON® and Blue Cloud, AMAZON® Machine learning, N2Cloud with ViNNSL neural network paradigm description language and N2Sky cloud-based neural network system, OPENNEBULA® (IaaS) and GOOGLE® Prediction API.

Figure 4B:
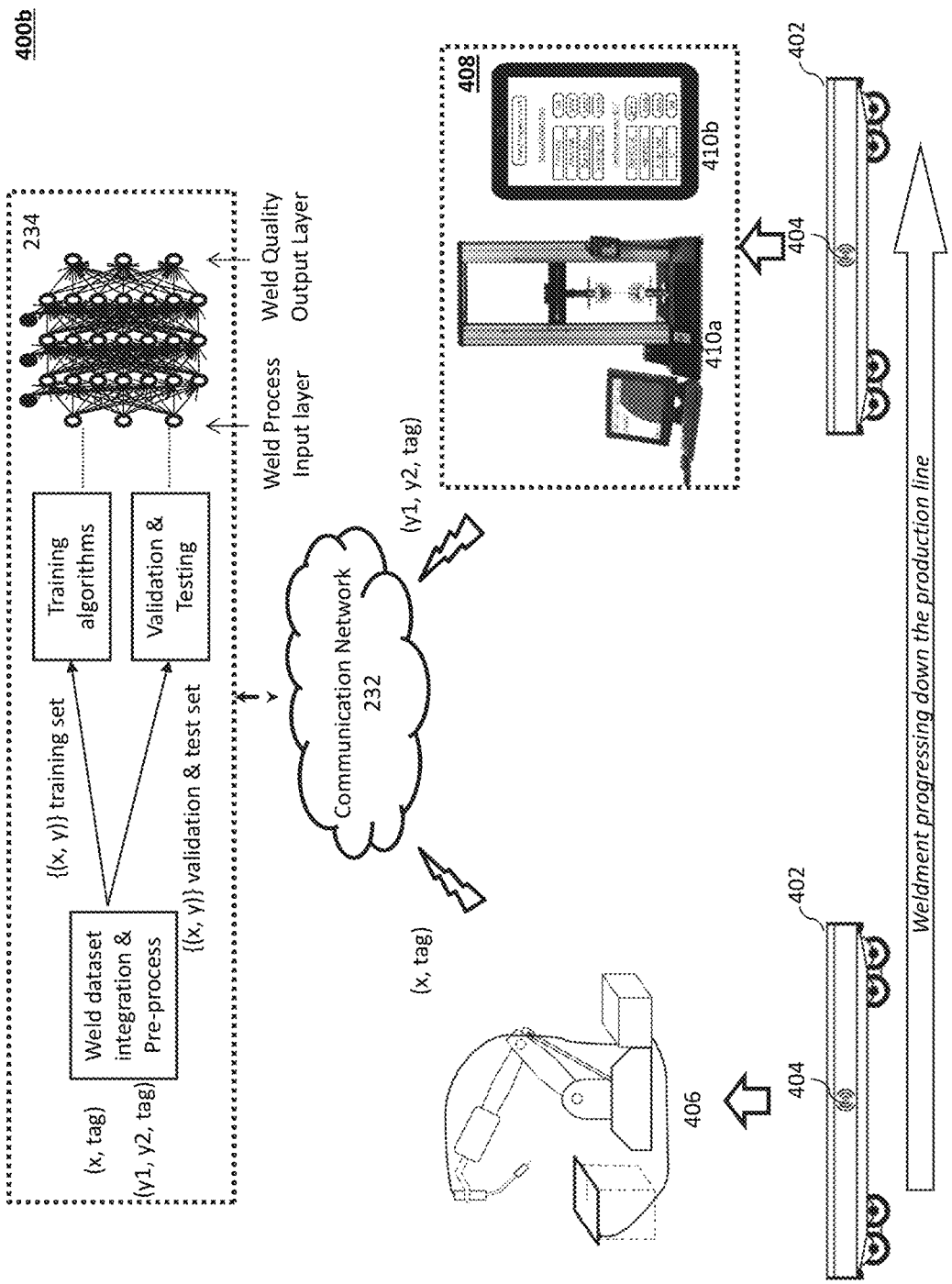
FIG. 4b illustrates example system architecture for quality assurance usage.

FIG. 4b illustrates example system architecture 400b for quality assurance usage. A problem encountered with fabricators is the inefficiency of data collection to correlate and cause and effect in welding quality diagnostics and control and the dependency of highly skilled professionals as manual labor tightly coupled with the production. The welding process data may be acquired from welding equipment and the quality reports, which may be generated at much later time by different people at the quality assurance department. Accordingly, FIG. 4b illustrates two types of data entry method. One is a networked weld tester that can automatically record the weld test result and digitally transmit to the cloud. For example, a tensile test machine 410a with network connectivity may be used, such as those available from INSTRON®, which may employ BLUEHILL® software to record test data, calibration data, and instrument component life conditions into a cloud database. Also shown is manual data entry of test results on a computing device 410b (e.g., a computer, laptop, tablet, smart phone, etc.) also with network connectivity or via social network (FACEBOOK® messages and TWITTER® tweets). The computing device 410b may provide, for example, the inspection user interface 300b of FIG. 3b.

Either quality assurance device 410a, 410b may be configured to scan tag 404, or otherwise enter tag information, for traceability back to the weld process data associated with the weld under test or inspection. Although a tensile test machine 410a is illustrated at the quality assurance area 408, many forms of destructive and non-destructive tests and inspections may be performed on the tagged welds and weldments. The test results, along with pass/fail criteria can be captured to the analytics computing platform 234 (e.g., via a cloud) manually or automatically, which would attempt to provide "ease of use" benefit. A frontend system may be provided to receive welding processes data and quality inspection data from various fabricators and store the raw data into HADOOP® NoSQL data store (hash table), RDMS/SQL or Coli/OLAP etc. For moving data, REST HTTP end point, FTP, MQTT, APACHE™ SQOOP™ may be used for connectivity to relational database and data warehouses, and Flume for continuous data stream. The welds being made should be tagged to provide traceability back to the quality assurance records, but other tracking techniques may be employed.

Figure 4C:
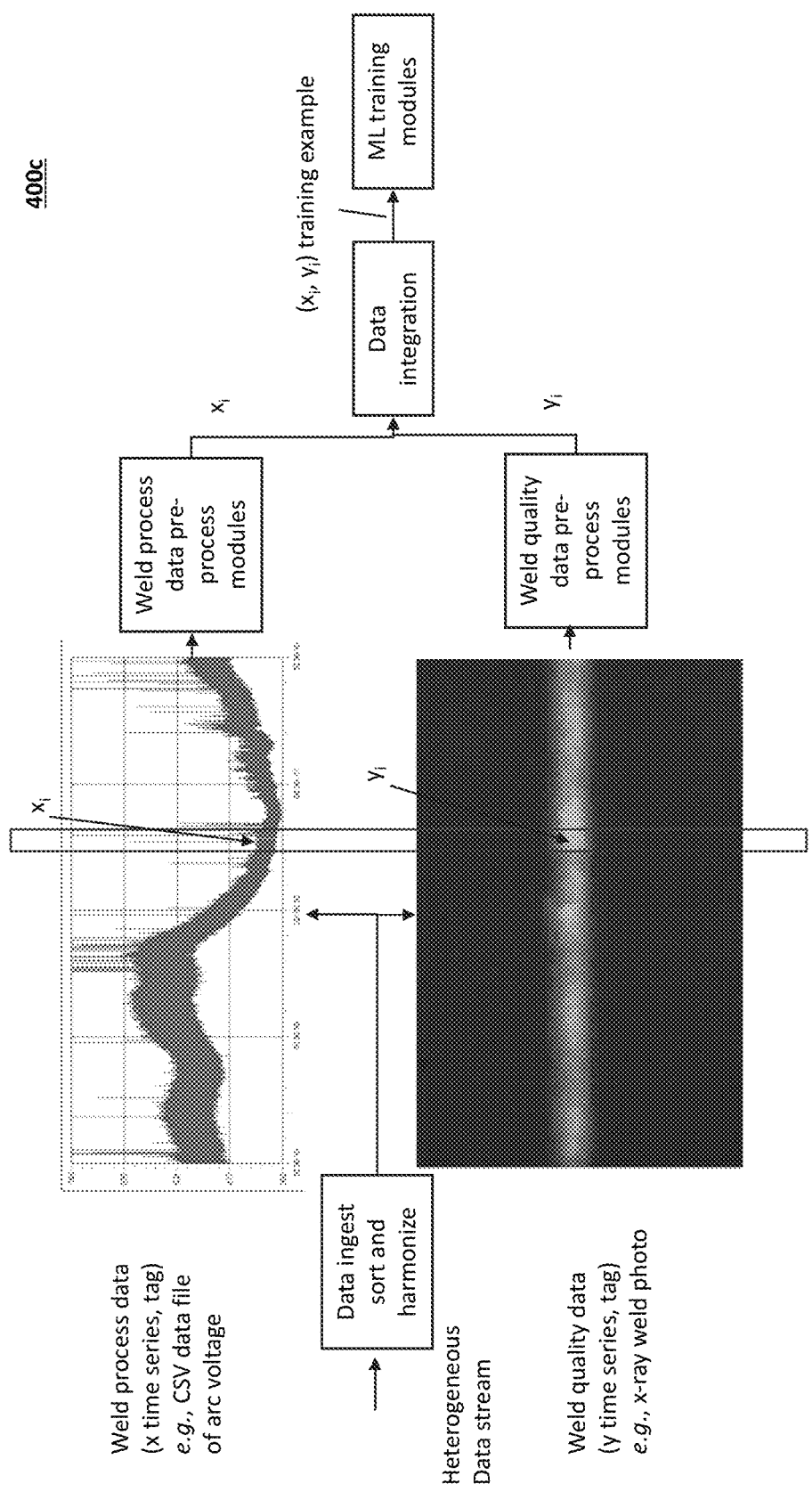
FIG. 4c illustrates example system architecture for integration and assembly of two disparate sources of data for machine learning model training.

FIG. 4c illustrates example system architecture 400c for integration and assembly of two disparate sources of data for machine learning model training. It should be noted that in this particular case, a time-to-distance transformation is used to integrate or correlate the weld x-ray image (spatial dimension based) and the weld process data (time based), so that an (x, y) pair of training example can be extracted from these two disparate data formats for machine learning. This can be done manually by fabricator, but the automation by cloud service provides this "ease-of-use" efficiency benefit at a low cost. Thus, a cloud service may be used to pre-process unstructured raw data from various tools, sensors, inspection instruments, cameras, text files, welding machine parameters, fault log and event files, cameras pictures, videos and audios, weld qualification records, procedure qualification records, even service technician or weld inspector's spreadsheet or handwritten notes, into a structured data that can be used for machine learning algorithms. Unstructured or semi-structured data in raw format should be decoded to extract structured data value; and to separate the semantic elements and enforce hierarchies of records and fields with the data; and to combine the data from different sources based on their tags or markers.

Figure 4D:
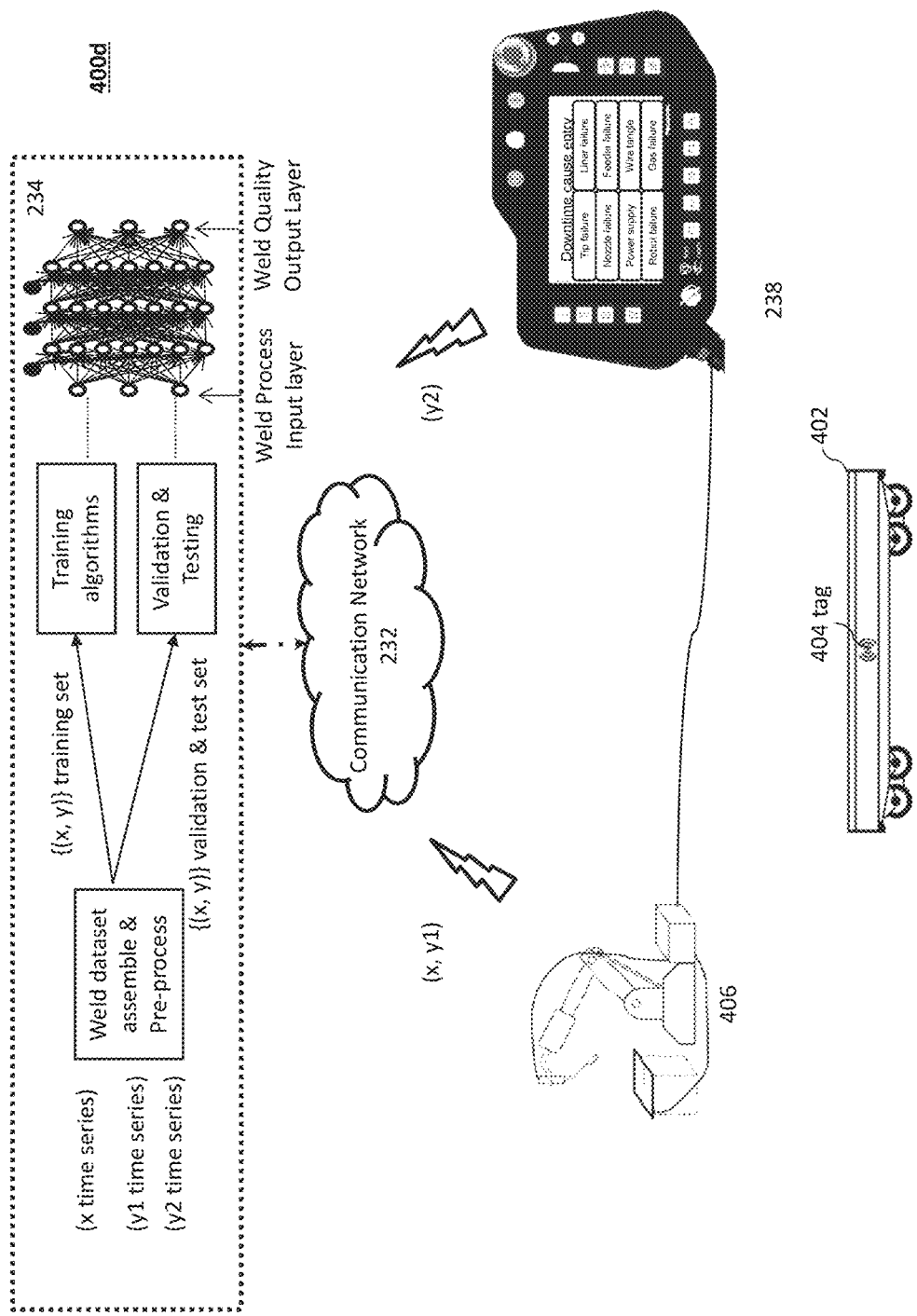
FIG. 4d illustrates an example system architecture for condition-based maintenance (CBM) usage.

FIG. 4d illustrates example system architecture 400d for condition-based maintenance (CBM) usage. An objective is to identify conditions from welding process signals out of the sensors and welding equipment to predict when failure or fault may occur, prior to its happening, so that PM or preventative maintenance may be optimized and downtime may be minimized. FIG. 4d illustrates an operator interface 238 to capture "y2" data, which may be provided via operator interface 238, 510, for service or maintenance personnel or robot operator to log the service event. The operator interface 238 may be a screen on robot teach pendent, which may be positioned in each robot cell (e.g., at welding cell 406) or shared among a group of welding cells in a production line. The operator interface 238 allows service personnel to easily push a button to characterize the reason of the service, e.g., contact tip change, out of shielding gas, bent torch from collision, etc. The operator interface 238 may provide, for example, the inspection user interface 300a of FIG. 3a. The operator interface 238 may be provided as a webpage served directly by the cloud http servers so that the data can directly go straight into one of the raw data HBase tables before being consumed by the preprocessor described in FIG. 4c. The webpage may also serve as a display of service interval prediction such as the number of robot welding cycles before the contact tip life will expire. Email, warning light display or pager may be used for altering the service personnel or weld operator of impending service events from the prediction.

The one or more analytics computing platforms 234 may employ a supervised machine learning algorithm relying on data labeling generated by human (e.g., via operator interface 238, 510) and/or machine, such as linear regression, logistic regression, neural network, and support vector machine (SVM) large margin classifier. The one or more analytics computing platforms 234 may instead employ an unsupervised machine learning algorithm that does not rely on user labeling of the output, such as K-means (e.g., KNN classification), Kohonen self-organizing maps, competitive learning, clustering, PCA for general anomaly detection and for data compression as part of supervised machine learning. One example application of unsupervised learning is mining the dataset to identify features in that are critical to quality (CTQs) as part of the lean manufacturing DMADV (Define Measure Analyze Design Verify) or DFSS (Design for Six Sigma) methodology. In certain aspects, the one or more analytics computing platforms 234 may employ a combination of both supervised and unsupervised machine learning algorithms. Optionally, the welding equipment 210 may be configured with computational hardware to pre-process the raw data, extract relevant features, perform dimensionality reduction or data compression, etc.

Figure 4E:
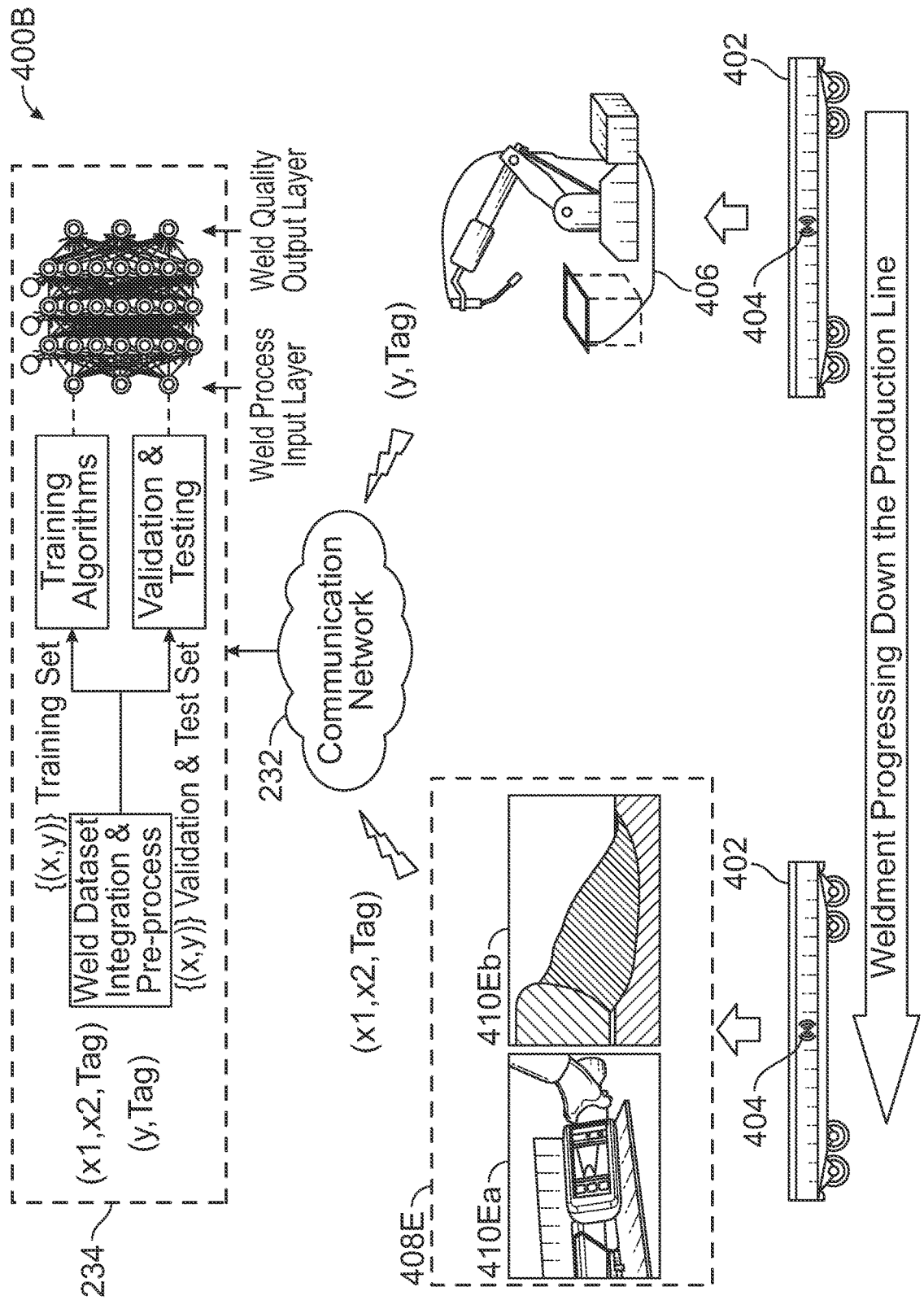
FIG. 4e illustrates an example system architecture for machine learning of the relationship between welding process parameters and weld shape.

FIG. 4e illustrates example system architecture for machine learning of the relationship between welding process parameters and weld shape (e.g., bead profile and penetration profile). One object of machine learning is to simplify the weld parameter programming to achieve certain desired weld bead and penetration profile. This objective was exemplified by Miller Electric "AutoSet" feature on some of its products, such as MILLERMATIC®. Instead of programming the welding equipment with conventional voltage and current, Auto-Set allows programming by plate thickness. In more complicated welding such as, pulse welding, up to, for example, 3 dozen weld parameters is meticulously programmed by a welding expert through experience and experimentation. The objective is not only a more advanced version of AutoSet in weld geometry rather than plate thickness, but also simplifying and automating the tedious work of establishing a mathematical model of the weld parameters and weld geometry. The neural network input are shown to come from bead profile as x1 vector, e.g., from laser scanner WIKI-SCAN™ commercially available from ServoRobot 410Ea; and also come from weld penetration profile as x2 vector, e.g., from PAX-IT™ image analysis software processing a weld macro 410Eb. The neural network output comes from the welding process parameters in the robot weld cell 406. Tagged weld geometry vectors x1 and x2 and tagged weld process parameter vector y1 will be pre-processed to provide training sets in back-propagation neural net training; and validation sets and test sets to assess the training errors. Once the neural network is trained with acceptable error, it may be used for programming the welding equipment in 406 to achieve the desired weld profile: user interface 238 in FIG. 2 may display a web page served out of Analytics computing platform(s) 234 that runs the "Weld parameter prediction" virtual machine. The web page may comprise a weld profile similar to 410Eb in FIG. 4e for user to draw or specify a desired weld geometrical shape and size, and a button to generate the conventional weld parameters such as volts and amps. Another machine learning method could be flipping the inputs and outputs shown in FIG. 4e. In other words, weld parameters (x1, tag) and weld conditions (x2, tag) will be input and weld geometry will be output (y1, y2, tag). An example weld condition is fit-up condition, such as joint gap, which can be scanned by WIKI-SCXAN™ 410Ea. Other conditions could be weldment surface condition, weldment material chemistry data, welding consumables data, etc. The model will predict weld geometry based on weld parameters. After the neural network is trained, it may be used to predict weld geometry based on the welding parameters: user interface 238 in FIG. 2 may display a web page served out of Analytics computing platform(s) 234 that runs the "Weld geometry prediction" virtual machine. The web page may comprise a graphical representation of the weld macro similar to 410Eb in FIG. 4e to show user what the expected weld looks like with the weld parameters programmed in the welding equipment 210. The user may play out "what-if" scenarios to see possible parameter optimization routes. For example, the user may change the gap size of the joint and see the effect on the bead profile. Although FIG. 4e only illustrates two dimensional weld measurements (bead profile and penetration profile), other dimensions may be measured and used for machine learning, e.g., spatter level, distortion, residual stress, microstructure, hardness, mechanical properties of the weld, discoloration, surface blemish, etc.

Figure 5:
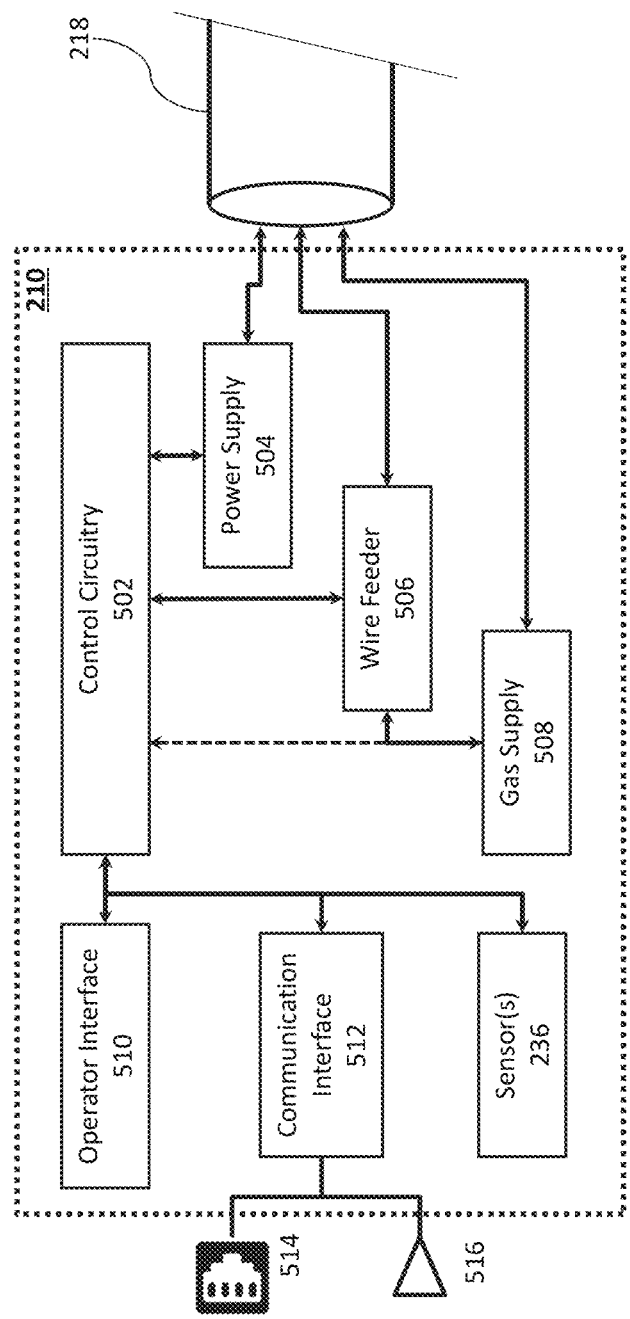
FIG. 5 illustrates example welding equipment in accordance with an aspect of this disclosure.

FIG. 5 illustrates a block diagram 500 of exemplary welding equipment 210 in accordance with an aspect of this disclosure. As illustrated, the welding equipment 210 generally comprises an operator interface 510, control circuitry 502, power supply circuitry 504, a wire feeder module 506, a gas supply module 508, an antenna 516, a communication port 514, and communication interface circuitry 512.

The operator interface 510, as well as the above-referenced operator interface 238, may comprise electromechanical interface components (e.g., screen, speakers, microphone, buttons/switches, touchscreen, cameras, voice recognition or hand gesture recognition input device, an industrial personal computer (IPC) or programmable logic controller (PLC), barcode scanner, etc.) and associated drive circuitry. The operator interface 510 may generate electrical signals in response to operator input (e.g., screen touches, button/switch presses, voice commands, remote sensor input, etc.). Driver circuitry of the operator interface 510 may condition (e.g., amplify, digitize, etc.) the signals and communicate them to the control circuitry 502. The operator interface 510 may generate audible, visual, and/or tactile output (e.g., via speakers, a display, and/or motors/actuators/servos/etc.) in response to signals from the control circuitry 502. In certain aspects, one or more components of the operator interface 510 may be positioned on the welding tool, whereby control signals from the one or more components are communicated to the control circuitry 502 via conduit 218.

In certain aspects, the operator interface 510 may be partially automated by a camera, scanner, memory device reader, and/or a measurement device. The operator interface 510 may also be a digital interface to equipment in the welding station or instruments in weld inspection so that the classification can be made automatically. While the operator interface 510 is illustrated as being integrated with the welding equipment 210, the operator interface 510 may be a standalone device (e.g., as described above with regard to operator interface 238), remotely situated (e.g., at the welding cell 406, the inspection station 408, or elsewhere), accessible via communication network 232, and/or provided as multiple operator interface modules 510 (e.g., a first operator interface may be used for controlling the welding equipment 210, while a second operator interface may be used for weld production knowledge purposes, such as entering fault classification).

The control circuitry 502 comprises circuitry (e.g., a microcontroller and memory) operable to process data from the operator interface 510, the power supply 504, one or more sensors 236, the communication interface 512, the wire feeder 506, and/or the gas supply 508; and to output data and/or control signals to the operator interface 510, the power supply 504, the communication interface 512, the wire feeder 506, and/or the gas supply 508. For instance, the control circuitry 502 may be operatively coupled with an engine (or motor) speed control circuit and/or transformer control circuit. The control circuitry 502, or other processing circuitry, may be configured to process one or more attributes of the weld, which may be captured by one or more sensors, to yield welding data associated with a given weld.

Optionally, the control circuitry 502 may be further configured to pre-process raw data collected from the one or more sensors 236 (whether internal, or external, to the welding equipment 210), extract relevant features, perform dimensionality reduction, data compression, etc. The preprocessor may pre-process the raw data into features to train the machine-learning algorithm. For example, statistics of any arc welding process signal (e.g., the welding voltage or current, wire drive motor current) time series can be pre-processed to extract average, root mean squared, minimum, maximum, and standard deviation. Analysis of short circuit entry and exit current based on arc voltage can be calculated along with any statistics. For arc welding processes with short circuit, the ratio of the arc duration and the short circuit duration, sequential probability ratio or cumulative sum can be pre-processed as a feature. Heat input per linear weld length and cooling rate may be computed. Open circuit voltage (OCV), wire stubbing events, arc instability, and abnormal current surge in short circuit can be counted using thru-the-arc signals. Another pre-process could be the segmentation of time series, such as segmenting the time series into arc start, crater fill, arc end, and the data in between.

Another more granular segmentation may be for each repetitive waveform, such as pulse current and voltage waveform in pulse welding, or short response in short circuiting welding or other welding processes containing periodic short circuits. For multivariate time series of arc voltage and current pattern recognition, these waveform segments can be clustered into groups in terms of statistical features using agglomerative hierarchical clustering. Frequency domain analysis such as Fast Fourier Transform (FFT) and state space system identification or plant estimation can also be used to extract features out of the time series of the raw data. Generally speaking, a processor for pre-processing data can use map-reduce techniques to scan the raw data; extract key features; and perform sort, shuffle, aggregate, summarize, filter, or transform functions prior to sending the welding data to the analytics computing platform 234. The pre-processing may also facilitated speech-to-text processes as pre-processing via the user interface. Alternatively, a time series of the raw data, e.g., arc current and voltage data, can be used to train a k-nearest neighbor classifier algorithm directly. Euclidean distance measure or a structure based similarity measure may also be used for pattern recognition.

The communication interface circuitry 512 comprises circuitry (e.g., a microcontroller and memory) operable to facilitate communication with one or more other devices or systems. The communication interface circuitry 512 is operable to interface the control circuitry 502 to the antenna 516 and/or port 514 for transmit and receive operations. For transmit, the communication interface 512 may receive data from the control circuitry 502 and packetize the data and convert the data to physical layer signals in accordance with protocols in use on the communication link 230. In certain aspects, the data may be communicated in batches, rather than in real time, but real time is still possible. For example, welding data from the welding equipment 210 may be communicated to the analytics computing platform 234 in batches, which may be sent periodically (e.g., hourly, daily, every shift, every weld cycle, every part, every weld, etc.) or upon generating a predetermined volume of welding data to be transmitted. For receive, the communication interface may receive physical layer signals via the antenna 516 or port 514, recover data from the received physical layer signals (demodulate, decode, etc.), and provide the data to control circuitry 502.

The antenna 516 may be any type of antenna suited for the frequencies, power levels, etc. used by the communication link 230.

The communication port 514 may comprise, for example, an Ethernet over twisted pair port, a USB port, an HDMI port, an RS485 port, a CANbus port, an ETHERCAT® port, and/or any other suitable port for interfacing with a wired or optical cable.

The gas supply module 508 is configured to provide gas (e.g., shielding gas) via conduit 218 for use during the welding or cutting process. Shielding gases are generally inert, or semi-inert, gases used in several welding processes, most notably gas metal arc welding and gas tungsten arc welding (e.g., MIG and TIG). A purpose of shielding gases is to protect the weld area from oxygen, and moisture containing hydrogen. Depending on the materials being welded, these atmospheric gases can reduce the quality of the weld or make the welding more difficult. The gas supply module 508 may comprise an electrically controlled valve for controlling the rate of gas flow. The valve may be controlled by a control signal from control circuitry 502 (which may be routed through the wire feeder 514, or come directly from the control circuitry 502). The gas supply module 508 may also comprise circuitry for reporting the present gas flow rate to the control circuitry 502. In terms of plasma cutters, the gas supply module 508 may be configured to provide gas for cutting purposes.

In an example implementation, the gas supply module 508 may comprise circuitry and/or mechanical components for measuring the gas flow rate such that the reported flow rate is an actual flow value and not simply an expected flow value based on calibration, thereby providing increased reliability and accuracy. While a gas supply module 508 is illustrated, certain welding processes can use other methods of protecting the weld from the atmosphere. For example, shielded metal arc welding uses an electrode covered in a flux that produces carbon dioxide when consumed, a semi-inert gas that is an acceptable shielding gas for welding steel. Thus, the gas supply module 508 need not be used for all welding techniques, and, in such cases, need not be present in the welding equipment 210.

The wire feeder module 506 is configured to deliver a consumable wire electrode 514 to the weld joint 212. The wire feeder module 506 may comprise, for example, a spool for holding the wire, an actuator for pulling wire off the spool to deliver to the weld joint 212, and circuitry for controlling the rate at which the actuator delivers the wire. The actuator may be controlled based on a control signal from the control circuitry 502. The wire feeder module 506 may also comprise circuitry for reporting the present wire speed and/or amount of wire remaining to the control circuitry 502. In an example implementation, the wire feeder module 506 may comprise circuitry and/or mechanical components for measuring the wire speed, such that reported speed is an actual speed, and not simply an expected value based on calibration, thereby providing increased reliability. For TIG or stick welding, the wire feeder module 506 may not be used (or may not even be present in the welding equipment 210).

The power supply circuitry 504 comprises circuitry for generating (or otherwise providing) power to be delivered to a welding electrode via conduit 218. The power supply circuitry 504 may comprise, for example, one or more generators, voltage regulators, current regulators, switch mode power supplies, and/or the like. The voltage and/or current output by the power supply circuitry 504 may be controlled by a control signal from the control circuitry 202.

The power supply circuitry 504 may be, for example, a transformer-rectifier-style power supply, which converts high voltage grid power to low voltage welding power; or, as discussed a generator-style power supply, which converts mechanical energy into electrical energy.

The analytics computing platform 234, of which multiple may be provided/available, may include any system configured to receive, control, manage, monitor, and/or otherwise use, data sent to (or from) the welding equipment 210, including, without limitation, welding information management systems and/or weld production knowledge systems and/or preventative/predictive maintenance (PPM) and condition-based maintenance (CBM) systems and/or human operator performance taxonomy and skill training systems (for example correlate weld results to operator ID as an input feature in the hypothesis) and/or production control systems (for example correlate an upstream pre-weld stamping operation change to a change in weld quality) and/or core enterprise business systems, such as MES (manufacturing execution system), ERP (Enterprise Resource Planning), CRM (customer relationship database), PLM (product lifecycle management), HRM (human resource management), and PDES (process development execution system).

An exemplary analytics computing platform 234 may comprise a processor configured to perform one or more algorithms (e.g., weld production knowledge machine learning algorithms) and a non-transitory data storage device. The processor may be communicatively and operatively coupled with one or more non-transitory data storage devices, which may be a non-transitory, computer-readable medium having one or more databases (e.g., weld data store(s) having a large scale dataset) and/or computer-executable instructions embodied therein. The computer-executable instructions, when executed by the processor, facilitate the various quality assurance systems and algorithms disclosed herein. Thus, the non-transitory data storage device may be further configured to store any received welding data (e.g., welding data received by the analytics computing platform 234 from a welding system) and to create a weld data store of previously received welding data (e.g., historic welding data), which may employ a large-scale dataset associated with one or more fabricators. Thus, in certain aspects, the weld data store may employ a large scale dataset comprising, for example, (1) welding process data collected from welding equipment that is associated with one or more fabricators, and/or (2) weld quality data associated with said welding equipment that is associated with one or more fabricators. The fabricators represented in the weld data store need not be related, rather, they may be unrelated fabricators. In other words, the weld data store may dynamically receive and store the welding process data that is to be used in both present and/or future weld analyses.

The welding process data and the weld quality data may be organized such that certain welding data features are deemed to be indicative of, or representative of, one or more of (1) set points; (2) set conditions; (3) fault classification; and/or (4) quality classifications.

The analytics computing platform 234, for example, may employ a weld production knowledge machine learning algorithm to analyze welding data vis-à-vis a weld data store. The analytics computing platform 234 may facilitate continuous network learning so that the parameters of the weld production knowledge machine learning algorithm can slowly adapt to the changing system behavior. For example, the welding equipment calibration may drift over time, causing sensor data drift over time. The tooling or fixture may wear out over time, thus causing drift. The parameters in the weld production knowledge machine learning algorithms may adapt and compensate for the drift. To handle a large-scale dataset, it is possible to use parallel processing linear algebra libraries in the network datacenter to improve training speed in handling very large-scale dataset.

Using binary classification as an example for predicting contact tip wear or tip change classification problem where the robot is welding a part with several welds in a cycle and presents the contact tip to a camera for inspection after each weld cycle. If we denote "y"=1 for event that a tip is changed unexpectedly by operator (e.g., weld bead is off-joint, wire is burned back to the tip, or tip is frozen etc.), or deemed unusable worn down condition not from routine change; and "y"=0 otherwise. "x" will be the image of the contact tip (with wire retracted to expose the unobscured exit hole) captured by sensor 236 (e.g., a camera). The learning objective is to find clues in the data collected by the sensors to predict or forecast a tip failure before it happens. In other words, the objective is to learn the probability p (y=1|x; θ). Instead of using a fixed training set from a fixed historic database, the parameters of a hypothesis are continuously updated in a forever loop pseudo code shown below:

Equation 3

Repeat forever {
    Wait for next contact tip image to be captured by one or more sensors
    Use PCA for image compression and feature (x) extraction
    If tip is to be changed, wait for human operator to enter tip condition "y" into operator interface
    Upload new training example to analytics computing platform via communication network
    Update θ using live training example of (x, y):
        $\theta_j := \theta_j - \alpha\ (h_\theta(x)-y)\ x_j\ (j = 0,...,n)$
} where α denotes learning rate, h denotes hypothesis and parameter θ of quantity n are all updated simultaneously.

Although logistic gradient descent is shown in the pseudo code, other algorithms may be used to minimize cost function and improve prediction accuracy over time. An alternative method is to use welding process sensor data as features instead of image as "x." The features may be the power spectral density of voltage or current according to, for example, U.S. Pat. No. 5,221,825, or a vector of welding current, standard deviation of current and welding voltage according to, for example, U.S. Pat. No. 8,354,614. Since each robot cycle may contain several welds performed by different welding programs, the corresponding pseudo code is for each specific weld program using the same set-points on the same location of the part being welded by the robot:

Equation 4

```
Repeat forever {
    Wait for completion of the weld done by one particular weld
    program
    If tip is to be changed, wait for human operator to enter tip
condition "y" into user interface
    Segment the weld signals and discard the arc start and arc end time
    series
    Preprocess the "x" vector at welding equipment
    Upload new training example to the analytics computing platform
via communication network
    Update θ using live training example of (x, y):
        θ_j := θ_j - α (h_θ(x)-y) x_j (j = 0,...,n)
}
```

Although the pseudo code uses the welding signals from the entire weld except arc start and arc end time series, it is possible to use signals acquired every second for finer resolution or faster in-weld prediction, or to use signals aggregated for the entire weld cycle (with varying set-points as additional features) if weld cycle cannot be interrupted for proactive tip change. The "x" vector may be preprocessed using, for example, the techniques of U.S. Pat. Nos. 5,221,825 and/or 8,354,614. The benefit is that the hypothesis is under continuous renewal, rebirth, and renovation to adapt to changes in production, such as slow sensor drift and tooling wear or a sudden change of new batch of contact tips from supplier. Existing "one-shot" neural network train, deploy and forget method will not be able to handle the real life changes in production and would be very costly to be re-trained for sustainability. Finally, precision and recall of the "live" performance of hypothesis may be displayed on operator interface 238 for user discretion of their tradeoff User interface may also display the predicted life of contact tip, or $h_θ(x)$ to alert operator for pro-active tip change to avoid unexpected downtime.

The weld production knowledge machine learning algorithm and/or system can be centralized at the analytics computing platform 234. For example, Equation 3 and Equation 4 may be implemented as Java classes, Python packages or C++ shared libraries using machine-learning libraries such as MAHOUT™ in layer 234c and 234d enabled by distributed data processing such as MapReduce and distributed file system such as HDFS in layer 234b on a HADOOP® cluster 234a. As welding data is continually being generated, the weld production knowledge system and database at the analytics computing platform 234 can continuously and continually evolve. The analytics computing platform 234 thereby allows the fabricator to receive software and/or dataset updates via communication network 232. For example, a subscription business model may be employed to monetize a weld production knowledge service across multiple fabricators, which makes use of the welding data in ways above and beyond a mere productivity monitor. Thus, a centralized weld production knowledge system provided via the analytics computing platform 234 can offer a number of advantages, including, inter alia: ease of use, reduced cost, and continuous learning.

Figure 6:
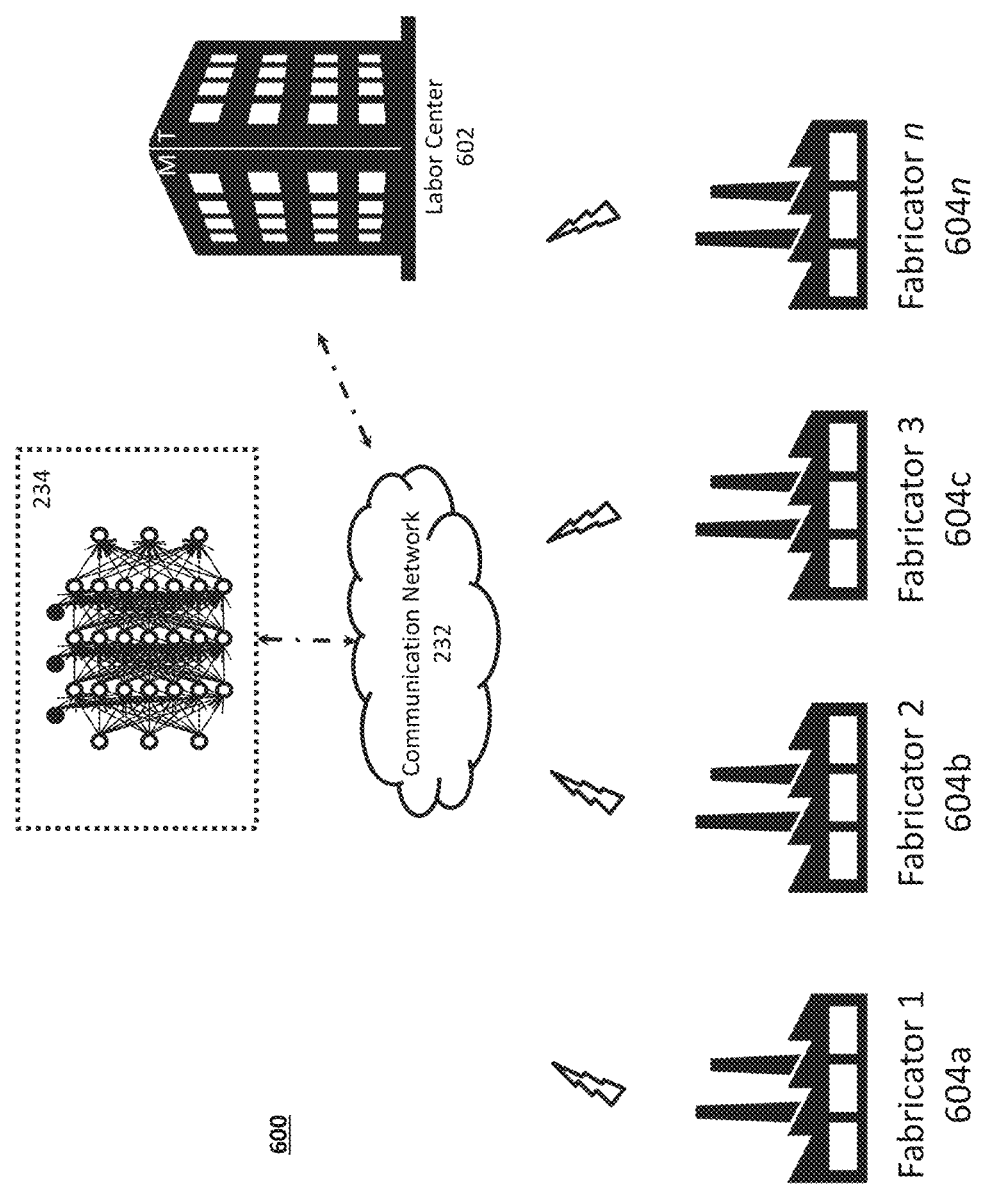
FIG. 6 illustrates an exemplary remote monitoring welding process system.

As illustrated with regard to FIG. 6, the analytics computing platform 234's centralized weld production knowledge system allows the fabricator 604, or a third party (e.g., service provider to the fabricator), to remotely monitor and/or manage one or more welding systems (or welding equipment). For example, machine learning analysts and weld engineers may be situated at a remote analyst labor center 602 with access to the analytics computing platform 234, without physically visiting each customer's location (e.g., each fabricator 604a, 604b, 604c, 604n). These analysts may remotely use tools (e.g., MATLAB®, Octave, etc.) installed at the analytics computing platform 234 to perform manual tasks such as examining feature histogram and perform various transformation of features to achieve a normal distribution (i.e., Gaussian) before feeding the features into a chosen weld production knowledge machine learning algorithm; manually inspecting the learning curves, and performing training and cross-validation error analysis and ceiling analysis; manually choosing features and see the effect in error analysis to separate anomaly from normal distribution, etc. Weld engineers at the Labor Center may remotely query the weld data stores, accessing the weld process data, as well as corresponding weld quality data at the big data analytics computing platform, and remotely perform welding engineering tasks such as identifying the root cause of porosity, lack of fusion or solidification cracking. Another example of labor service provided by weld engineer to fabricators is to extract weld bead profile and penetration profile from the weld macro picture, with software such as to-be-automated versions of commercially available software PAX-IT® or NAMeS or ad-hoc weld image analytical tools hosted at the big data analytics computing platform. The measurements can be used for quality assurance purposes or as training sets for machine learning algorithms at the big data analytics computing platform. Yet another example of cloud-enabled labor service is a statistician and/or weld engineer runs DESIGN-EXPERT® from DESIGN-EASE®, a statistical "designed experiment" analytical tool for weld dataset analysis for fabricators at large. Yet another example of cloud-enabled remote labor service is a six sigma black-belt using Minitab MINITAB® tool for six-sigma analysis on data streamed to the big data analytics computing platform for fabricators at large. Yet another example of cloud-enabled remote labor service is a quality assurance engineer using INSTRON'S® DIC Replay software and TRENDTRACKER® software for post-test weld mechanical/material properties data visualization and statistical analysis for fabricators at large. Yet another example of cloud-enabled remote labor service is an online welding simulation tool such as E-Weld Predictor from Edison Welding Institute using finite element analysis based on fabricators production and design data uploaded to the analytics computing platform in the cloud. As also illustrated in FIG. 6, the analytics computing platform 234 can aggregate similar welding data from various plants and various manufacturers to extract correlations, trends, and intelligence. For example, short circuiting welding process and pulse welding process are used in many automotive plants and used in root pass pipe welding in oil & gas industry with similar characteristics. Welding fabricators may extract actual kilowatts, duty cycle, service records, quality records, and other usage and output patterns from its entire fleet of welding equipment to optimize shifts for power consumption, to optimize service intervals and just-in-time service parts delivery, to optimize material flow, to optimize supply management and to measure its manufacturing capabilities and capacity in real time. An analyst together with a weld engineer may invoke the recommender system to quantify the benefits of MILLER'S® RMD or CSC welding process or HOBART'S® F6 or Matrix welding filler metal or TREGASKISS® ICE technology or PRAXAIR'S® StarGold shielding gas from one fabricator's plant to another. Without the architecture in FIG. 6, it would be very costly to combine the welding datasets from different industries and applications to derive common insight or hypothesis of short circuit welding process on that applies to both automotive industry and oil & gas industry.

In certain quality assurance weld inspection and preventative/predictive maintenance (PPM) and condition-based maintenance (CBM) applications, the end user may weigh false negative to be more consequential than false positive due to the cost associated with them. For example, rather than using $F_1$ score (i.e., F-score or F-measure) in evaluating anomaly detection algorithm, a remote analyst may help configure the metric to favor recall (i.e., the fraction of relevant instances that are retrieved) over precision (i.e., the fraction of retrieved instances that are relevant). While not required, a remote analyst may customize the cost function to optimize hypothesis parameter learning for a specific application for a specific customer. Generally speaking, network based machine learning allows analysts to remotely tweak and customize the hypothesis parameters (and/or anomaly threshold) for a specific application without incurring travel cost.

The analytics computing platform 234 further allows for randomization, trending, artificial data synthesis, cross-validation, and testing of a large-scale dataset acquired from different welding stations, whether at one fabricator, or multiple different fabricators, which may share common characteristics. Common characteristics may include, for example, a common work piece material type (and thickness), same welding consumables, and/or weld requirement. Randomization achieved from large-scale dataset installed globally can provide insight into the causation of certain weld defect or categorization of certain welding process or industry characteristics, beyond simple correlation from smaller dataset at isolated applications. Data collected in one application, e.g., acoustic record of short circuiting welding with grinder noise in the background, may be synthesized with the acoustic record of an identical short circuiting welding except with hammer noise in the background. The dataset from one weld station may be used for algorithm training, while the dataset from a second weld station may be used for cross-validation of the algorithm, yet the dataset from a third weld station may be used for testing of the algorithm.

As noted above, operator interface 238, 510 may be provided at the welding station, or remotely, which enables welding personnel to enter, or otherwise indicate, any equipment fault classification and/or quality classification. In operation, such marking data may be included as part of the welding data. For example, a weld may be marked as "acceptable" or "unacceptable" based on information collected using one or more sensors 236, or entered via the operator interface 238, 510. For example, welding personnel may use operator interface 238 to enter data that is not captured by sensors 236 or digitally from machinery or instruments. For example, human operator may enter the event of "contact tip change" because he used a wrench and physically changed the contact tip. The tip change is not automatically captured by sensor so that learning cannot take place unless he enters this event into the operator interface 238. Another example is that the tensile machine pulling samples does not know if the result is pass or fail. A human operator may look at the tensile test report and manually enter pass/fail into the computer. For example, a tensile result of 10 KSI may be reported by the tensile machine 410a, but a required minimum may be, for example, 12 KSI to pass. The operator can enter a pass/fail to the system (classification) or enter the 10 KSI into the system (non-classification output).

The welding personnel may further mark the weld with any fault classification, quality classifications, or other information. The welding data (including any marking data) may then be stored to the analytics computing platform 234's weld data store, where the analytics computing platform 234 manages the welding data via neural network, statistical engines, and/or other mathematical models to establish quality indicator with statistical confidence. That is, welding data may be communicated to the analytics computing platform 234 for processing, while providing traceability to the weldments. The welding equipment 210 may be configured to report programmed set points and set up conditions to the analytics computing platform 234 with traceability to the weldments. Monitored aspects may include, but are not limited to: arc start performance, arc stability, spatter and fume level, liner monitor, weld cable life monitor, contact tip life monitor, shielding gas leak monitor, wire quality monitor, penetration monitor, interpass temperature and cooling rate monitor, surface contamination and coating monitor, etc.

This approach separates the duty of data gathering and data processing to parties who can best perform these tasks efficiently; giving end operator the responsibility of assigning acceptable and/or unacceptable thresholds based on statistical confidence; and minimizing the travel cost and software licensing and maintenance cost of others providing such a service.

Figure 7:
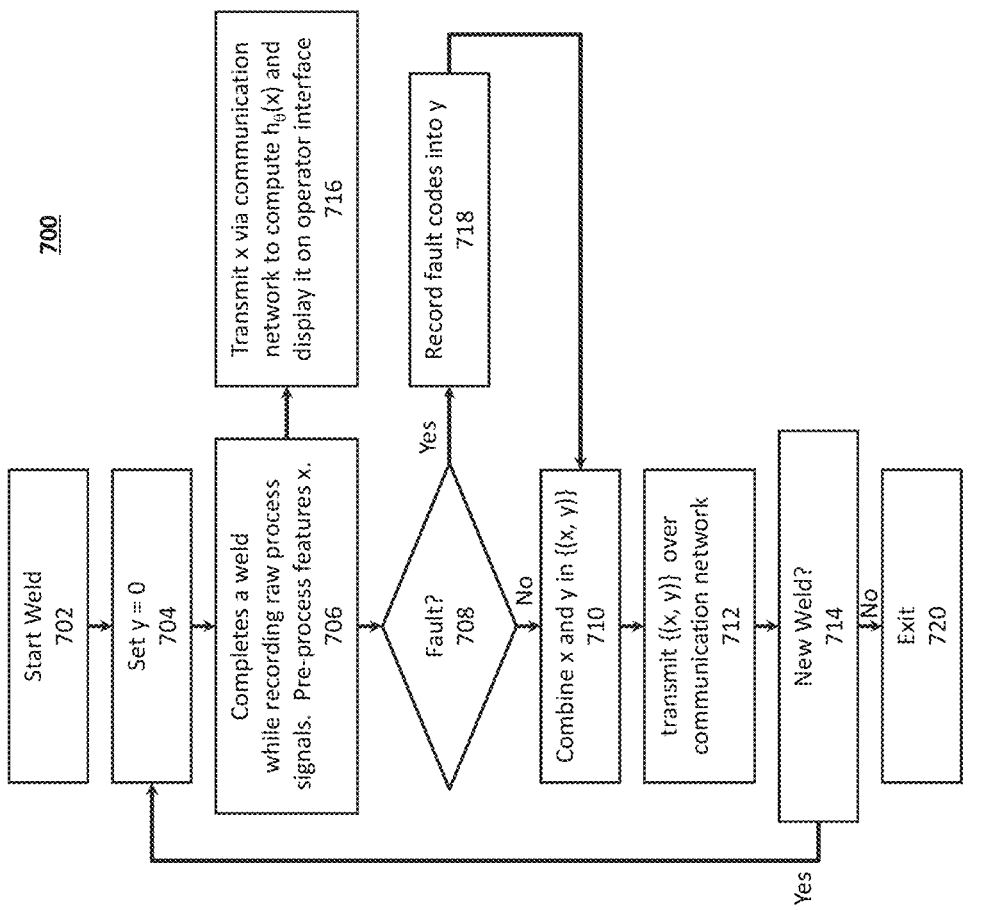
FIG. 7 illustrates a flowchart of an example weld production knowledge machine learning algorithm's process for detecting a fault, in accordance with an aspect of this disclosure.

FIG. 7 illustrates a flowchart 700 of an example weld production knowledge machine learning algorithm's process, in accordance with an aspect of this disclosure. Specifically, shown in FIG. 7 is flow chart 700, comprising a plurality of example steps (represented as blocks 702-720) for detecting fault, which may be performed by a processor associated with the analytics computing platform 234 that is configured to facilitate the weld production knowledge system or algorithm, by welding equipment 210, or a combination thereof. While the steps are illustrated in a particular order, the weld production knowledge machine learning algorithm's process need not be performed in exactly the same order. Further, certain steps may be omitted or added depending on the preferences of the provider.

At step 702, the weld production knowledge system starts. The production control process may start by way of, for example, the operator interface 238, 510 or automatically. For example, upon activating the robot 202 or actuating the trigger (i.e., starting the weld), the production control process may automatically start. The production control process may also be configured to run continuously.

At step 704, the weld production knowledge system initially sets "y" to equal zero (0).

At step 706, the robot 202 (or operator) completes a weld while recording raw process signals. The welding equipment 210 may then pre-process the raw process signals to yield features "x."

At step 708, the weld production knowledge system determines whether there has been a fault based at least in part on the processed raw process signals. In instances where there is a fault (e.g., by the robot 202, or operator), the process proceeds to step 718; otherwise (e.g., where there is no fault), the process proceeds to step 710.

At step 710, the analytics computing platform 234 combines the "x" and the "y" together to form a complete training example {(x, y)}.

At step 712, the complete training example {(x, y)} is communicated via communication network 232.

At step 714, the weld production knowledge system determines whether a new weld is anticipated. In instances where a new weld for another weldment is anticipated, the process may return to step 704, where the steps are repeated for the next weldment; otherwise (e.g., where another weldment is not anticipated, or a time-out occurs), the process ends at step 720. In instances where the production control process is configured to run continuously, the process may return to step 704.

At step 716, the welding equipment 210 transmits "x" to the analytics computing platform 234 via communication network 232 via to compute $h_\theta(x)$ and display its output on operator interface 238, 510.

At step 718, the fault code associated with the detected fault from steps 708 is recorded into the "y."

At step 720, the process ends until, for example, the system is reset, or another weldment is anticipated or triggered.

Figure 8:
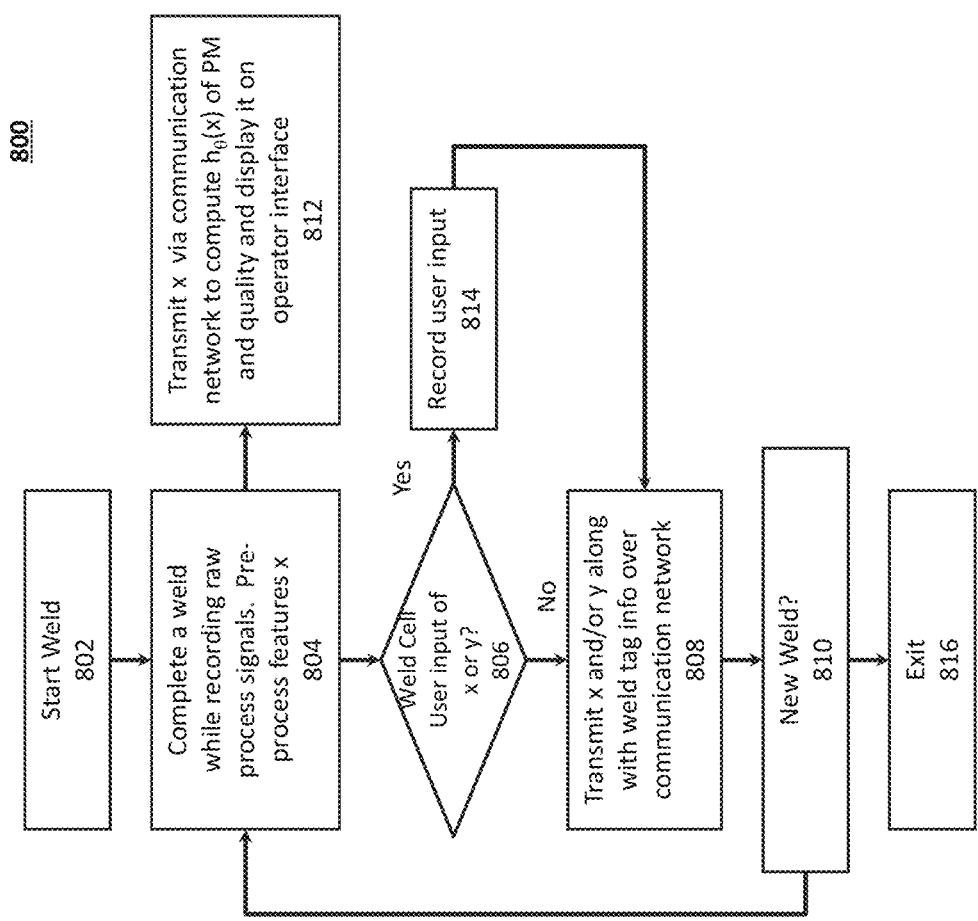
FIG. 8 illustrates a flowchart of a first example weld production knowledge machine learning algorithm's process for detecting a defect, in accordance with an aspect of this disclosure.

FIG. 8 illustrates a flowchart 800 of a first example weld production knowledge machine learning algorithm's process, in accordance with an aspect of this disclosure. Specifically, shown in FIG. 8 is flow chart 800, comprising a plurality of example steps (represented as blocks 802-816) for predicting defect, which may be performed by a processor associated with the analytics computing platform 234 that is configured to facilitate the weld production knowledge system or algorithm, by welding equipment 210, or a combination thereof. While the steps are illustrated in a particular order, the weld production knowledge machine learning algorithm's process need not be performed in exactly the same order. Further, certain steps may be omitted or added depending on the preferences of the provider.

At step 802, the weld production knowledge system starts. The production control process may start by way of, for example, the operator interface 238, 510 or automatically. For example, upon activating the robot 202 or actuating the trigger (i.e., starting the weld), the production control process may automatically start. The production control process may also be configured to run continuously.

At step 804, the robot 202 (or operator) completes a weld while recording raw process signals. The welding equipment 210 may then pre-process the raw process signals to yield features "x."

At step 806, the weld production knowledge system determines whether the operator has input either an "x" and/or "y" value.

At step 808, the welding equipment 210 transmits metadata or the "x" and/or "y" value, along with any tag information, to the analytics computing platform 234 via communication network 232.

At step 810, the weld production knowledge system determines whether a new weld is anticipated. In instances where a new weld for another weldment is anticipated, the process may return to step 804, where the steps are repeated for the next weldment; otherwise (e.g., where another weldment is not anticipated, or a time-out occurs), the process ends at step 720. In instances where the production control process is configured to run continuously, the process may return to step 704.

At step 812, the welding equipment 210 transmits "x" to the analytics computing platform 234 via communication network 232 via to compute $h_\theta(x)$ of PM and display it, along with quality, on operator interface 238, 510.

At step 814, defect code associated with the defect from steps 806 is recorded to the analytics computing platform 234's weld data store.

At step 816, the process ends until, for example, the system is reset, or another weldment is anticipated or triggered.

Figure 9:
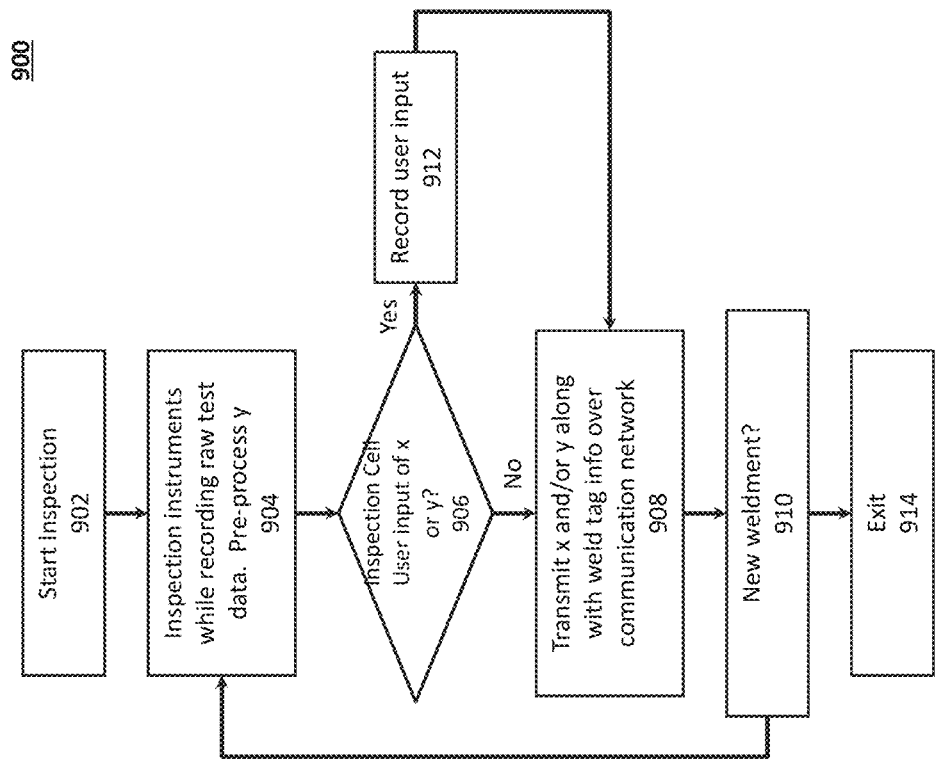
FIG. 9 illustrates a flowchart of a second example weld production knowledge machine learning algorithm's process for detecting a defect, in accordance with an aspect of this disclosure.

FIG. 9 illustrates a flowchart 900 of a first example weld production knowledge machine learning algorithm's process, in accordance with an aspect of this disclosure. Specifically, shown in FIG. 9 is flow chart 900, comprising a plurality of example steps (represented as blocks 902-914) for detecting defect, which may be performed by a processor associated with the analytics computing platform 234 that is configured to facilitate the weld production knowledge system or algorithm, by welding equipment 210, or a combination thereof. While the steps are illustrated in a particular order, the weld production knowledge machine learning algorithm's process need not be performed in exactly the same order. Further, certain steps may be omitted or added depending on the preferences of the provider.

At step 902, the weld production knowledge system starts. The production control process may start by way of, for example, the operator interface 238, 510 or automatically. For example, upon activating the robot 202 or actuating the trigger (i.e., starting the weld), the production control process may automatically start. The production control process may also be configured to run continuously.

At step 904, the robot 202 (or operator) completes a weld while recording raw process signals. The welding equipment 210 may then pre-process the raw process signals to yield features "x."

At step 906, the weld production knowledge system determines whether the operator has input either an "x" and/or "y" value.

At step 908, the welding equipment 210 transmits the "x" and/or "y" value, along with any tag information, to the analytics computing platform 234 via communication network 232.

At step 910, the weld production knowledge system determines whether a new weld is anticipated. In instances where a new weld for another weldment is anticipated, the process may return to step 904, where the steps are repeated for the next weldment; otherwise (e.g., where another weldment is not anticipated, or a time-out occurs), the process ends at step 914. In instances where the production control process is configured to run continuously, the process may return to step 904.

At step 912, defect code associated with the defect from steps 906 is recorded to the analytics computing platform 234's weld data store.

At step 914, the process ends until, for example, the system is reset, or another weldment is anticipated or triggered.

To increase ease of use, an existing infrastructure of data collection (e.g., a welding information management system) may be retrofitted with a welding data labeling interface (e.g., operator interface 238, 510) such that predictions regarding maintenance and quality control can be made using subsequent welding data. In one implementation, the algorithm training can be automated where the welding data labeling interface may be a digital interface to other welding equipment, or weld quality inspection instruments. Because the weld production knowledge machine learning algorithms have acceptable accuracy, a welding fabricator may have more efficient preventative/predictive maintenance (PPM) and condition-based maintenance (CBM) to reduce downtime, reduce maintenance cost. A fabricator may have more efficient quality assurance to reduce quality assurance inspection cost and, at the same time, improved quality assurance. Another example of ease of use is the prediction of contact tip wear using computer vision and anomaly classifier. For example, in robotic welding cell 406, after each weld cycle, the robot can present the front end of the GMAW torch to a camera (e.g., a grayscale, laser scanner type, etc.) to capture the images of the contact tip. The contact tip images of multiples of the welding cycles immediately preceding the tip failure may be labeled as "y"=1 for positive, while all the images before may be labeled as "y"=0 for negative. The images may undergo map reduce for dimensionality reduction before being used to train a neural network in the analytics computing platform 234 via backpropagation to learn neural network parameters. Alternatively, instead of images of the contact tip, arc signals in multiples of weld cycles immediately preceding the tip failure can be used to train the algorithm as "y"=1 and prior signals as "y"=0.

The present methods and systems may be realized in hardware, software, or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. One implementation may comprise rack servers and another may comprise blade servers. Another typical implementation may comprise an application specific integrated circuit or chip (ASIC) or reconfigurable field-programmable gate arrays (FPGA) or multi-core processors or general-purpose graphics processing units (GPUs, GPGPUs) and CUDA-enabled NVIDIA' GPUs or OpenCL-enabled open source GPUs or vector processors designed for parallel processing. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. Some implementation may comprise INTEL® 18-core XEON® E7 v3 server chips, HADOOP® nodes, CLOUDERA® Enterprise Data Hub, virtual machines, RED HAT® Enterprise, or OPENSUSE® LINUX® operating system, DELL'S® PowerEdge VRTX server system and virtualized big data analytics computing platform, and RAVO reference architecture of virtual organization integrating into the cloud service stack (SaaS, PaaS, and IaaS).

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the invention as defined by the following claims.

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A welding system comprising:
a first processing circuitry to process a first welding input from a first data source associated with a welding operator to define a first welding data, wherein the first data source comprises an optical sensor positioned in a weld cell adjacent to a welding operation being performed to fabricate a completed weldment to capture one or more attributes of the welding operation in real-time or near real-time, wherein the completed weldment is associated with a physical traceability tag;
a second processing circuitry to process a second welding input from a second data source to define a second welding data, wherein the second data source is an operator interface configured to receive operator inputs from the welding operator;
a third processing circuitry to process a third welding input from a networked weld tester to define a third welding data, Wherein the networked weld tester is configured to physically, test at least one quality of the completed weldment and the third welding input reflects said at least one quality of the completed weldment; and
a communication network communicatively coupled with the first processing circuitry, the second processing circuitry, the third processing circuitry, and a remotely situated analytics computing platform,
wherein the communication network communicates the first welding data, the second welding data, and the third welding data to said remotely situated analytics computing platform via the communication network,
wherein the remotely situated analytics computing platform is facilitated via a cloud computing framework that employs a distributed and scalable file system running on a commodity cluster hardware,
wherein the remotely situated analytics computing platform associates the first welding data, the second welding data, and the third welding data with one another based at least in part on tag data collected from the physical traceability tag to define a welding data set
wherein the remotely situated analytics computing platform dynamically generates or updates a large scale dataset in real-time or near real-time based at least in part on said welding data set from a plurality of heterogeneous data sources comprising the first data source and the second data source to derive a common hypothesis applicable to at least two of said plurality of heterogeneous data sources, the large scale dataset comprising weld operational, production, and productivity data, weld quality data, weldment quality data, welding process data, and welding machine parameters data collected from the plurality of heterogeneous data sources, and
wherein the remotely situated analytics computing platform employs a low bias neural network comprising a production knowledge machine learning algorithm to analyze the welding data set vis-a-vis the large scale dataset to predict a characteristic of the completed weldment using the common hypothesis, to classify the completed weldment as either acceptable or unacceptable as a function of the characteristic of the completed weldment, and to evaluate performance of the welding operator over a time period.

2. The welding system of claim 1, wherein the optical sensor is integrated with welding headwear of the welding operator.

3. The welding system of claim 1, wherein the first data source is associated with a first physical location and the second data source is associated with a second physical location that is different from said first physical location.

4. The welding system of claim 1, wherein the first data source and the second data source are associated with a single physical location.

5. The welding system of claim 1, wherein the remotely situated analytics computing platform cleans or formats the first welding data and the second welding data into a standardized or structured form.

6. The welding system of claim 1, wherein the production knowledge machine learning algorithm is agnostic to welding operation type, weldment type, or welding application type.

7. The welding system of claim 1, wherein the remotely situated analytics computing platform is further configured to generate a control signal based at least in part on the characteristic that is transmitted back to the weld cell for weld process control.

8. The welding system of claim 1, wherein said cloud computing framework is a Platform as a Service (PaaS) or an Infrastructure as a Service (IaaS).

9. The welding system of claim 1, wherein said cloud computing framework employs MapReduce parallel processing.

10. The welding system of claim 1, wherein said cloud computing framework is a platform for managing heterogeneous distributed data center infrastructures.

11. The welding system of claim 1, wherein said production knowledge machine learning algorithm is a scalable machine learning algorithm.

12. The welding system of claim 1, wherein said production knowledge machine learning algorithm is an unsupervised learning algorithm that employs at least one technique selected from a group consisting of: (1) k-means; (2) principal component analysis; (3) hierarchical clustering; (4) self-organizing maps; (5) fuzzy k-means; (6) Dirichlet distribution; (7) independent component analysis; (8) expectation-maximization; (9) mean-shift; and (10) competitive layer neural network.

13. The welding system of claim 1, wherein said production knowledge machine learning algorithm is a supervised learning algorithm that employs at least one technique selected from a group consisting of: (1) linear regression; (2) logistic regression; (3) adaptive logistic regression; (4) artificial neural networks; (5) support vector machines; (6) Naïve Bayesian classifiers; (7) decision trees; (8) random forests; (9) recurrent neural network; (10) nonlinear autoregressive; (11) radial basis; and (12) learning vector quantization algorithms.

14. The welding system of claim 1, wherein the characteristic is employed to facilitate a function selected from a group consisting of: (1) machine learning; (2) predictive modeling or analytics; (3) automation of fault detection and diagnostics; (4) automation of process control; (5) automation of maintenance; (6) automation of quality control; (7) welding personnel training; (8) warranty assessment; (9) weldment design optimization; (10) weld equipment design optimization; (11) welding consumables design optimization; and (12) production workflow optimization.

15. The welding system of claim 1, wherein the large scale dataset further comprises welding equipment maintenance data, weld geometry data, weld quality data, and welding operation productivity data.

16. The welding system of claim 1, wherein the second welding data includes marking data received via the operator interface, wherein the marking data indicates whether said weld, weldment, or weld process is subject to one or more quality classifications or fault classifications.

17. The welding system of claim 1, wherein the communication network receives said first welding data and said second welding data in batches or in live streaming format.

18. A production knowledge system for processing information collected from welding equipment, the production knowledge system comprising:
- a communication network communicatively coupled with welding equipment situated at one or more physical locations, wherein the communication network is configured to receive, from said welding equipment, a first welding data representing a first welding input, from a first data source, a second welding data representing a second welding input from a second data source, and a third welding data representing at least one physically-tested quality of a completed weldment, wherein the first data source comprises an optical sensor positioned in a weld cell adjacent to a weldment to capture one or more attributes of a welding operation being performed to fabricate the completed weldment, or the welding equipment used to perform the welding operation, in real-time or near real-time, wherein the completed weldment is associated with a physical traceability tag; and
- are analytics computing platform remotely situated from the welding equipment and operatively coupled with the communication network,
- wherein the analytics computing platform is facilitated via a cloud computing framework that employs a distributed and scalable file system running on a commodity cluster hardware,
- wherein the analytics computing platform associates the first welding data with the second welding data based at least in part on tag data collected from the physical traceability tag to define a welding data set,
- wherein the analytics computing platform dynamically generates or updates a large scale dataset in real-time or near real-time based at least in part on said welding data set from a plurality of heterogeneous data sources comprising the first data source and the second data source to derive a common hypothesis applicable to at least two of said plurality of heterogeneous data sources, the large scale dataset comprising weld operational, production, and productivity data, weld quality data, weldment quality data, welding process data, and welding machine parameters data collected from the plurality of heterogeneous data sources, and
- wherein the analytics computing platform employs a low bias neural network comprising a production knowledge machine learning algorithm to analyze the welding data set vis-a-vis the large scale dataset to predict a characteristic of the welding equipment or the completed weldment using the common hypothesis, to classify the completed weldment as either acceptable or unacceptable as a function of the characteristic of the completed weldment, and to predict a remaining life of a consumable tool of said welding equipment.

19. The production knowledge system of claim 18, wherein the optical sensor is integrated with welding headwear of the welding operator.

20. The production knowledge system of claim 18, wherein the first data source is associated with a first physical location and the second data source is associated with a second physical location that is different from said first physical location.

21. The production knowledge system of claim 18, wherein the first data source and the second data source are associated with a single physical location.

22. The production knowledge system of claim 18, wherein the analytics computing platform generates a control signal based at least in part on the characteristic.

23. The production knowledge system of claim 18, wherein said cloud computing framework employs MapReduce parallel processing.

24. The production knowledge system of claim 18, wherein said cloud computing framework is a platform for managing heterogeneous distributed data center infrastructures.

25. The production knowledge system of claim 18, wherein said production knowledge machine learning algorithm is a scalable machine learning algorithm.

26. The production knowledge system of claim 18, wherein said production knowledge machine learning algorithm is an unsupervised learning algorithm that employs at least one technique selected from a group consisting of: (1) k-means; (2) principal component analysis; (3) hierarchical clustering; (4) self-organizing maps; (5) fuzzy k-means; (6) Dirichlet distribution; (7) independent component analysis; (8) expectation-maximization; (9) mean-shift; and (10) competitive layer neural network.

27. The production knowledge system of claim 18, wherein said production knowledge machine learning algorithm is a supervised learning algorithm that employs at least one technique selected from a group consisting of: (1) linear regression; (2) logistic regression; (3) adaptive logistic regression; (4) artificial neural networks; (5) support vector machines; (6) Naïve Bayesian classifiers; (7) decision trees; (8) random forests; (9) recurrent neural network; (10) non-linear autoregressive; (11) radial basis; and (12) learning vector quantization algorithms.

28. The production knowledge system of claim 18, wherein the characteristic is employed to facilitate a function selected from a group consisting of: (1) machine learning; (2) predictive modeling or analytics; (3) automation of fault detection and diagnostics;
(4) automation of process control; (5) automation of maintenance; (6) automation of quality control; (7) welding personnel training; (8) warranty assessment; (9) weldment design optimization; (10) weld equipment design optimization; (11) welding consumables design optimization; and (12) production workflow optimization.

29. The production knowledge system of claim 18, wherein the large scale dataset further comprises welding equipment maintenance data, weld geometry data, weld quality data, and welding operation productivity data.

30. A production knowledge system for processing a welding data set associated with at least one weld, the production knowledge system comprising:
  a communication network communicatively coupled with welding equipment situated at two or more physical locations of unrelated fabricators,
  wherein the communication network is configured to receive, from said welding equipment, the welding data set associated with at least one weld,
  wherein the welding data set is generated based at least in part on an output signal from one or more sensors, the one or more sensors comprising an optical sensor positioned in a weld cell adjacent to a welding operation being performed to fabricate a completed weldment to capture one or more attributes of the welding operation in real-time or near real-time, and
  wherein said one or more sensors are situated to capture one or more attributes of the welding process;
  a networked weld tester that is configured to physically test at least one quality of the completed weldment and to automatically record and digitally transmit testing data via the communication network; and
  a processing circuitry that is situated remotely from at least one of said two or more physical locations,
  wherein the processing circuitry is operatively coupled with the communication network and a weld data store,
  wherein the weld data store employs a dataset, said dataset comprising heterogeneous weld manufacturing data collected from a plurality of physical locations,
  wherein the processing circuitry is configured to derive a common hypothesis applicable to the heterogeneous Weld manufacturing data, and
  wherein the processing circuitry employs a low bias neural network comprising a scalable machine learning algorithm to analyze the welding data set vis-a-vis the weld manufacturing data, to predict a characteristic of said at least one completed welding operation or completed weldment using the common hypothesis and to predict a remaining life of a consumable tool of said welding equipment.

* * * * *